US012498703B2

(12) United States Patent
Mecocci et al.

(10) Patent No.: US 12,498,703 B2
(45) Date of Patent: Dec. 16, 2025

(54) SYSTEMS AND METHODS FOR PROVIDING AUTOMATIC BATCH VALIDATION OF PROCESS DATA

(71) Applicant: Eurotherm Limited, Telford (GB)

(72) Inventors: Francesco Mecocci, Monterotondo (IT); Brett Matthew Swann, Worthing (GB); Andrew Peter Hodgson, Worthing (GB)

(73) Assignee: Eurotherm Limited, Telford (GB)

( * ) Notice: Subject to any disclaimer, the term of this patent is extended or adjusted under 35 U.S.C. 154(b) by 570 days.

(21) Appl. No.: 17/964,724

(22) Filed: Oct. 12, 2022

(65) Prior Publication Data
US 2024/0126246 A1    Apr. 18, 2024

(51) Int. Cl.
*G05B 19/418*    (2006.01)

(52) U.S. Cl.
CPC ............ *G05B 19/41865* (2013.01); *G05B 2219/32077* (2013.01)

(58) Field of Classification Search
CPC .... G05B 19/41865; G05B 2219/32077; G05B 19/4184; G05B 2219/31467; G05B 23/0272; G06F 11/302; G06F 9/44505; G06F 11/3089; G06F 11/3419; G06F 11/3072; G06F 11/321; G06F 11/3466;
(Continued)

(56) References Cited

U.S. PATENT DOCUMENTS

2003/0220709 A1 * 11/2003 Hartman ................ G06N 20/00
                                                          700/121
2010/0153124 A1    6/2010 Dasari et al.
(Continued)

FOREIGN PATENT DOCUMENTS

WO    WO-2021009689 A1 *  1/2021   ....... G05B 19/41845

OTHER PUBLICATIONS

Hong et al., Progressive PCA Modeling for Enhanced Fault Diagnosis in a Batch Processs, International Conference on Control, Automation and Systems, Oct. 27-30, 2010, Gyeonggi-do, Korea, pp. 713-718, ICROS.
(Continued)

*Primary Examiner* — Mi'schita' Henson
(74) *Attorney, Agent, or Firm* — Burris Law, PLLC

(57) ABSTRACT

A method and system are provided for validating process data on a process recorder/controller. The method and system involves: configuring the validation criteria of the process variables, by defining value and time tolerances with respect to an ideal performance; receiving in real-time process data, including one or more process values, for a batch process at the recorder/controller responsible for recording the process data; performing a batch validation process on the recorder/controller, the batch validation process analyzing in real-time the one or more process values to validate the batch process based on at least a batch validation criteria; and transmitting from the recorder/controller validation information including a validation result for presentation on a device to a user, and/or recording at least on the recorder/controller the validation information including at least the validation result, wherein the validation result indicates whether the batch process is conformant or non-conformant.

20 Claims, 12 Drawing Sheets

(58) Field of Classification Search
CPC ............. G06F 11/3688; G06F 11/3692; G06F 11/3696
See application file for complete search history.

(56) References Cited

U.S. PATENT DOCUMENTS

2016/0098037 A1    4/2016  Zornio et al.
2025/0103030 A1*   3/2025  Negi ................ G05B 19/41885

OTHER PUBLICATIONS

Extended European Search Report and Written Opinion issued in corresponding EP Application 23202578.3, issued Mar. 15, 2024, 9 pages.

* cited by examiner

SYSTEMS AND METHODS FOR PROVIDING AUTOMATIC BATCH VALIDATION OF PROCESS DATA

FIELD

The present disclosure is generally directed to a system and method of monitoring a batch process, and more particularly, to a system and method for real-time validation of process data of the batch process on a digital process data recorder/controller.

BACKGROUND

Batch processing is performed in various automation and manufacturing applications in industries, which can include life sciences, chemical, food and beverage, pharmaceuticals, heat-treatment and other industries.

SUMMARY

In accordance with an embodiment, a method and system are provided for validating process data. The method and system involves: receiving in real-time process data, including one or more process values, for a batch process at a digital process data recorder/controller responsible for acquiring the process data and recording the process data in a digital historical process data record; performing a batch validation process on the process data recorder/controller, the batch validation process analyzing in real-time the one or more process values to validate the batch process based on at least a batch validation criteria; and transmitting from the process data recorder/controller validation information including a validation result for presentation on a device to a user, and/or recording at least on the process data record of the digital process data recorder/controller the validation information including at least the validation result, wherein the validation result indicates whether the batch process is conformant or non-conformant.

In various embodiments, the analyzing operation can further comprise identifying a current state of the batch process based on the one or more process values and the batch validation criteria, and the transmitting operation further comprises transmitting a current validation state of the batch process or the one or more process value(s), along with the one or more process values for real-time presentation on the device to the user. The device comprises a human-machine interface associated with the process data recorder/controller, and/or a display of another system or device connected on a same local network as the process data recorder/controller.

In various embodiments, the method and system can further involve configuring the batch validation process, including the batch validation criteria, for use on the process data recorder/controller. The validation criteria of process variables can be configured by defining value and time tolerances with respect to an ideal performance. The ideal performance can be set by a discrete set of validation parameters and/or by a real-time input signal and/or by a recorded historical batch profile of the process. The batch validation criteria can comprise at least a tolerance for a constant value, a rate/ramp tolerance and/or a time tolerance. The batch process can comprise a plurality of phases, the batch validation criteria including a phase validation criteria for each of the plurality of phases, the batch validation process being configured to analyze in real-time the one or more process values in each phase based on a respective phase validation criteria to validate the batch process.

In various embodiments, the process data can comprises a live data stream of process data including the one or more process values, and the batch process can comprises a manufacturing process.

In various embodiments, the recording operation can securely record the validation information in a log in relation to the process data in memory.

In various embodiments, the method and system can further involve taking one or more actions based on the validation result. Furthermore, the method and system can further involve presenting on the device a current validation state of the batch process or the one or more process value(s), along with the one or more current process values, the displaying differentiating different validation states for the batch process or the one or more process values by color, pattern or other visual differentiator.

It is to be understood that both the foregoing general description and the following detailed description are exemplary and explanatory only and are not restrictive of the invention, as disclosed or claimed. The claims should be entitled to their full breadth of scope, including equivalents.

DESCRIPTION OF THE FIGURES

The description of the various example embodiments is explained in conjunction with the appended drawings.

DISCUSSION OF EXAMPLE EMBODIMENTS

Figure 1:
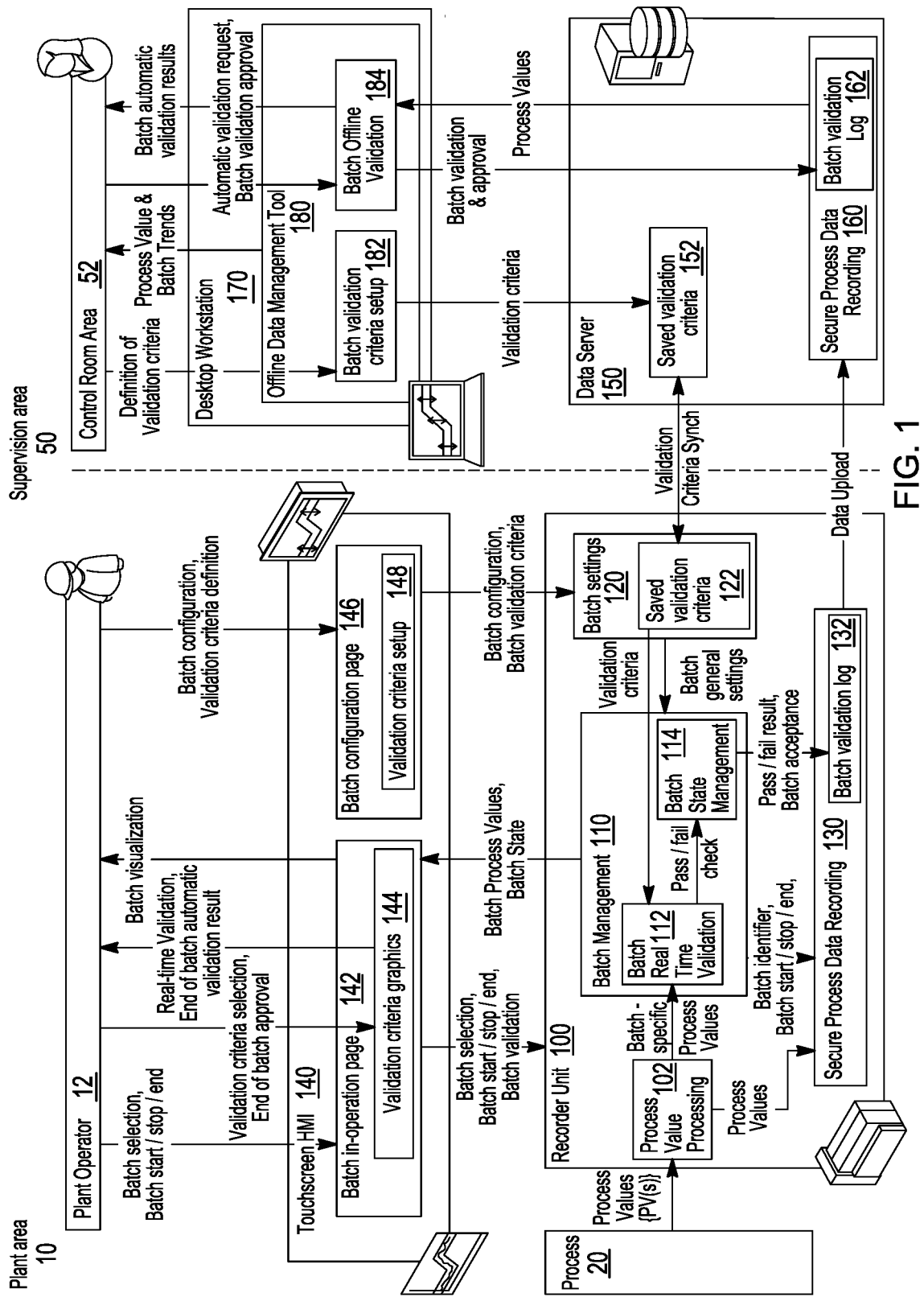
FIG. 1 is a block diagram of system architecture for recording and validating process data using a process data recorder/controller, in accordance with an embodiment.

In accordance with an embodiment, a method and system are provided for performing real-time batch validation on process data of a process batch(es) (also referred to as "batch process(es)" or "batch(es)"), in combination with the real-time secure recording of the process data in a storage/memory. The method and system can implement a batch validation process to validate in real-time the process data, such as one or more monitored process values (also referred to as "process variables", PVs or "process parameters") of the process batch, against applicable standards, criteria or requirements on a digital process data recorder and/or controller ("recorder/controller"), which is responsible for recording the process data on site, such as for example in a plant area at or around a measurement/monitoring location of the process data. Such standards or criteria are generally referred to herein as "validation criteria" or "batch validation criteria", and can be used to determine (e.g., determine, detect, identify, etc.) a state of the batch or its process value(s) and a validation result for the batch. A state of the batch, also referred to herein as batch validation state, can indicate whether a batch or its process values, such as for example at a point in time, are operating within process requirements defined by the validation criteria, e.g., conformant (e.g., normal, non-deviating, pass, etc.) or non-conformant (e.g., abnormal, deviating, fail, unknown, etc.). The batch validation result can indicate a resulting determination on whether a batch, when ended or completed, is compliant with the process requirements, e.g., conformant (e.g., pass, etc.) or non-conformant (e.g., fail, unknown, etc.).

In operation, the process data recorder/controller can employ the batch validation process or system (also referred to herein as "batch validator") to perform real-time analysis on the process data, such as one or more process values, of a batch to validate the batch or its process values; transmit live process data (e.g., process value(s)) and live validation information such as the batch validation state, over the course of the batch process to a device for real-time presentation to a user (e.g., visual output, audio output, etc.), and store the process data and validation information including the validation state and a validation result in a secure storage or file format. The validation results can be the batch validation state of the batch or its process value(s) over the course of the batch process, and can be stored in a validation log in relations to the corresponding process data of the batch. The batch validation process, including batch validation criteria, as well as the presentation/output format of batch-related information to the user can be configurable or customizable, such as by a user.

In various embodiments, the batch validator can be embedded in the process data recorder/controller itself to facilitate or enable real-time review by a user (e.g., operators, quality engineers, etc.) on-site or off-site, and allow for configuration and customization of user interface/display format(s) and validation criteria for batches of any manufacturing process. The batch criteria configuration and real time monitoring can be visualized on the device HMI as well as to any web-compatible device (e.g., personal computer or PC, tablet, smartphone, etc.) connected on the same local network. The validation result can be saved in the batch record and then can be presented in the supervisory offline PC-based data reviewer.

In various embodiments, a profile of process value(s) for a process batch can be pre-configured, using template(s), by a user and can include or define validation criteria for different phases (e.g., phases, segments, cycles, etc.) of the batch process along with other aspects of the process, including but not limited to a start of a batch, a start/end of each phase of a batch, and an end of a batch. The validation criteria can be used by the batch validation process to identify in real-time a validation state of whether the process data or one or more process values thereof are conformant or non-conformant with process requirements for a batch. The batch validation criteria can include but is not limited to PV-related tolerances (e.g., tolerance(s)) such as upper/maximum bound value and lower/minimum bound value or value range; tolerance for constant or variable value; a ramp/rate tolerance, a time tolerance for a phase of the batch or the entire batch, or a tolerance for any operating parameter of a batch or combination of parameters thereof, which can be received, obtained, derived, determined or calculated from the process data.

In various embodiments, the batch validator can be implemented as a monolithic block with extensible data, or composed by various functional blocks (e.g. a profile monitor and one segment validator for each process value or PV). The batch validator core functionality can support one or more inputs (e.g., process value input) to be validated. The number of inputs can be either user-configurable or derived from an upstream user function such as batch or recording group.

Accordingly, the batch validator can enable a user, such as an operator or quality engineer, to monitor in real-time the process value(s) and the batch validation state of a running batch, and to receive an automatic validation result for the batch. In this way, the user can take action when the batch is deviating from process requirements (e.g., terminate, restart, or pause execution of a non-conformant batch, etc.), can approve/disapprove a batch, can to review the process value(s) and validation state offline at a later time for further analysis, or take other actions. In various embodiments, the batch validator can provide various benefits or advantages, such as for example as follows:

Save configuration time (e.g., user friendly and dedicated configuration interface, rather than ad-hoc solutions adapting other tools).

Save money, as external tools may become redundant.

Save production time/increase throughput/save resources, as the validation can be executed automatically and non-conformant batches can be immediately brought to the attention of an operator (who can then take the appropriate action).

The batch validation (or process thereof) can be customizable, both in terms of user texts to be presented to operators and in terms of validation criteria (e.g., user customizable sequence of validation criteria and parametrization of thresholds). As a result of this customization, the batch validation is flexible. It can be applied to a variety of manufacturing batches including, for example, pharmaceutical, life science, food and beverage, heat treatment batches or other types of process batch(es) (also referred to as "batch process(es)").

Batch validation can be executed on an embedded device and specifically the same device dedicated to process data recording.

Real time Automatic execution: the batch validation can be executed together with the process batch itself. Users such as operators and quality engineers can be informed in real-time about the compliance of the process batch to the configured and selected validation criteria. Once the validation criteria are defined and selected, the validation process can be executed automatically.

Integration with offline data reviewer: the validation assessment can be stored by the recorder on the batch digital record and then can be presented for offline review and centralized storage in the offline PC-based data reviewer.

The batch criteria configuration and real-time monitoring can be visualized on a device such as a Human-Machine Interface (HMI) and/or any web-compatible device (e.g., PC, tablet, smartphone, etc.) connected on the same local network as the process data recorder/controller.

These and other examples of the batch validation method and system of the present disclosure will be described in greater detail below with reference to the figures.

FIG. 1 is a high level block diagram of a system architecture for monitoring a process batch(es), in accordance with an embodiment. The system architecture includes a plant area 10 and a supervision area 50. The plant area 10 includes a process 20 which is implemented by equipment in the plant area 10, a recorder unit 100 such as, for example, a data processor recorder/controller, and a user input/output device such as a touchscreen Human-Machine Interface (HMI) 140 associated with or dedicated to the recorder unit 100. A plant operator 12 can utilize the HMI 140 to receive information concerning the operation of the process 20, to control operation of the process 20, and to interact with the recorder unit 100 including the configuration of the settings for batch validation or other functions to be performed on the recorder unit 100. The supervision area 50 can include a data server(s) 150 which can communicate with the recorder unit 100 over a network(s), and a desktop workstation(s) 170. A user such as a control room operator 52 can use the desktop workstation 170 to configure batch settings and perform offline validation of process data and other data which are collected and stored on the recorder unit 100.

The process 20 can be a batch process(es), such as for example an automation or manufacturing process or sub-process thereof, which may be related to chemical, life sciences, food and beverage, heat treatment or other industry. In various embodiments, the process 20 can be a batch process for a regulated industry, such as pharmaceutical or heat treatment, or any application which may require secure (e.g., tamper-resistant, etc.) storage of process data or other related data of a process batch(es) for review, validation and recordkeeping. The process 20 can be a batch process(es), which can include one or more phases (e.g., phases, segments, sub-processes, etc.). Each phase may have associated therewith validation criteria, which may differ from other phase(s) of the process 20. In various embodiments, the process 20 can be implemented under control of a control system, which can, for example, be a programmable logic controller (PLC) in a SCADA (supervisory control and data acquisition) system for an industrial or other process which may be automated. The control system can employ a plurality of sensors in the plant area 10 to sense, detect or measure operating parameter(s)/variable(s) of the process 20 to obtain, derive, calculate or determine one or more process value(s) for the process 20, which in turn may be used by the control system to control or facilitate control of the process 20. Depending on the process application, a process value can, for example, include but is not limited to temperature, pressure or other process variable/parameter or combinations thereof.

The recorder unit 100 can be a computer system, which is configured to implement various functions, operations, processes or modules associated with the storage and validation of process data from or associated with the process 20 being monitored. These functions, operations, processes or modules (as well as data) can include, but are not limited to process value processing 102, batch management 110 including batch real-time validation 112 and batch state management 114, batch settings 120, and secure process data recording 130. The recorder unit 100 can be located at the point of measurement or monitoring of the process value(s) of the process data.

The process value processing 102 can be configured to receive and process the process data, including one or more process value(s) (PV(s)), of the process 20. The process data and its process value(s) can be provided in real-time as a data stream (or datastream) over time as the batch runs. Each process value can be provided on a separate input channel. The process value processing 102 can process the received process data, such as process value(s), for subsequent storage by the secure process data recording 130. The process value processing 102 also can process the received process data to provide batch-specific process values or a subset of the process values from the process data for real-time validation by the batch management 110.

The batch management 110 is configured to manage and control the operations associated with the real-time validation of the process data and the output/transmission and storage of data associated therewith. As shown, the batch management 110 can receive user-related information/instructions (e.g., user instructions or input) from the HMI 140, such as batch selection to select a type of batch to be validated, batch start/stop/end to indicate various phases of the running batch, and batch validation to initiate the validation process, and can configure and implement batch validation accordingly. The batch management 110 also is configured to output/transmit to the HMI 140 in real-time batch-specific process value(s) and validation information including a current state of the batch or validation state and a validation result, for real-time presentation on the HMI 140 to the user such as the plant operator 12.

As previously discussed, the batch management 110 includes batch real-time validation 112 and batch state management 114. The batch real time validation 112 is configured to implement a batch validation process which analyzes (or evaluates) in real-time batch-specific process value(s) against validation criteria for a process batch to validate the batch, e.g., to ascertain whether the batch complies or conforms with processing requirements or standards for the batch. The batch validation process can determine a current state of the batch (or batch state) or its process value(s) according to the current process value(s) and the validation criteria. The current batch state (also referred sometimes as "batch validation state") can indicate whether the batch process or its process value(s) are currently comply or deviate from the process requirements as defined by the validation criteria, or a particular level, severity or priority of the compliant or deviation of the batch process or its process value(s). The batch validation process also can determine a validation result, such as for example at the end of the batch, indicating whether the batch is compliant, e.g., conformant/pass or non-conformant/fail.

The validation criteria can, for example, include but is not limited to PV-related tolerances (e.g., upper/maximum bound value and lower/minimum bound value or value range; tolerance for constant or variable value; a ramp/rate tolerance, a time tolerance for a phase of the batch or the entire batch, etc.). Since a batch process can have a plurality of phases (e.g., phases, segments, cycles, etc.), one or more of the phases of the batch process or each of the phases of the batch process can have a validation criteria associated therewith. For example, a batch process can have associated therewith a batch validation criteria which can include a sequence of phase validation criteria. In some embodiments, the validation criteria for a particular phase can have different ranges of tolerances to reflect in a validation state the different levels, severity or priority of the compliance or deviation from process requirements of the batch process. The validation criteria can be preconfigured as part of a profile for a process batch or its process values, and can be selected by a user prior to starting the process batch. For example, the process value(s) to be monitored can have associated therewith a process value (PV) profile(s), which defines the validation criteria across the batch process for the process value(s). A batch profile can include a plurality of PV profiles for its process values to be monitored by the batch validation process. Validation profiles for distinct PV inputs can execute synchronously, e.g. all Input profiles have same number of phases in a given profile and phase progress is synchronous.

The batch state management 114 is configured to store information relating to the validation of a batch (also generally referred to as "validation information"), via the secure process data recording 130. The validation information can include, for example, the identified validation state (determined by the batch management 112) including date/time over the course of the batch process, a validation result for the batch process (e.g., conformant/pass, non-conformant/fail/need manual review, etc.), manual batch validation information (e.g., approval/acceptance or disapproval/rejection such as from the user provided via the HMI 140 including identity of the user and date/time for the approval/disapproval), and any other relevant information related to the batch process and validation thereof. In various embodiments, the validation information can be stored in a validation log(s).

The batch setting 120 is configured to manage, select, save/store, update and/or synchronize validation criteria 122, which can be configured by a user through the touchscreen HMI 140 or the desktop workstation 170/the data server 150. The batch settings 120 can save, update or select validation criteria 122 on the recorder unit 100 according to user configuration, such as received from the HMI 140 or the data server 150/the desktop workstation 170. For example, the user can create one or more batch profiles for different process batch(es) or types thereof, which can include validation criteria and other batch-specific information which may be used to indicate or determine when a batch starts, stops, ends, and when phases of a batch starts/ends/changes, from the process data or batch-specific PVs. These profiles also can include general settings for the validation process or the presentation of the process data and/or validation information (e.g., real-time or off-line presentation). A profile can be selected from the predetermined profiles via the HMI 140 or desktop workstation 170 and then stored or updated locally on the recorder unit 100 prior to running a batch, or a plurality of profiles can be stored locally on the recorder unit 100 from which a user can select a profile for use in validation prior to running a batch.

The recorder unit 100 also is configured to securely store data or information related to the validation of the batch in the secure process data recording 130. The data recording 130 is configured to record or store process data, including process value(s) of the process 20, in real-time in a secure record in storage/memory on the recorder unit 100 or associated with the recorder unit 100. The secure process data recording 130 also is configured to record or store validation information including, for example, a validation result from the real-time validation performed by the batch real-time validation 112 and the validation state of the batch process or its process value(s) over the course of its execution. The secure process data recording 130 also can be configured to record or store manual validation information, such as batch approval (or disapproval), which can be received from a user (e.g., via HMI 140). The validation information and batch approval (or disapproval) can be stored, for example, in a batch validation log 132, which can be linked to the corresponding stored process data. The secure process data recording 130 also is configured to upload data from the recorder unit 100 to the data server 150 for access and use thereof to perform off-line review and validation of the batch(es) and information associated therewith on the desktop workstation 170 or other computer device or system. In various embodiments, the data is stored by the secure process data recording 130 in a secure manner to prevent data tampering or any subsequent modification of the stored data and ensure data integrity. For example, the data records can be stored in a tamper resistant file format such as, for example, binary check summed files (UHH), or other secure data or file format.

The user input/output device such as a touchscreen human-machine interface (HMI) 140 can be a computer system, which is configured to implement various functions, operations, processes or modules to facilitate interaction between a user, such as the operator 12, and the recorder unit 100 as well as the control system for the batch process. The HMI 140 can be associated with the recorder unit 100 (e.g., dedicated to recorder unit(s), etc.) and connected to the data recorder directly or via a network, such as a local area network. The various functions, operations, processes or modules (as well as data) of the HMI 140 can include among other things a batch-in operation page 142, a batch configuration page 146, and other functionality to facilitate batch validation control and the output of information related to the batch validation process. The HMI 140 can be communicatively connected to the control system for the process 20 to facilitate control by the operator 12 of the batch process (e.g., selection, start, stop, end, etc.).

The batch-in operation page 142 is configured to provide a graphical user interface (GUI) through which the operator 12 can input instructions or other information to configure the operations of the batch validation by the recorder unit 100 and to configure/customize the output or presentation of the process data and validation information provided from the recorder unit 100. For example, the operator 12 through the batch-in operation page 142 can make a batch selection for the process batch to be implemented, control the operation of the selected batch including batch start, batch stop, batch end and other batch control operations (e.g., batch pause, batch terminate, batch reset, etc.). The operator 12 through the batch-in operation page 142 also can enter or select validation criteria for use by the recorder unit and can input an end of batch approval/disapproval for the batch, via the validation criteria graphics 144. The validation criteria graphics 144 also is configured to output, (e.g., such as visually, textually and/or graphically via a display/screen, audibly via speaker, etc.) in real-time batch-specific process value(s) of the process data, the validation state for the process value(s) as determined by the recorder unit 100, the end of batch automatic validation result from the recorder unit (e.g., batch conformant/pass, or batch non-conformant/fail) as well as other information such as recommendations (e.g., manual review), warnings/alarms and so forth. The output representation of this information can be customized by the operator to enable selection of an output format for the batch-specific process value(s) and validation information including validation state of the process value(s) and validation result. For example, the process value(s) and their validation state can be displayed in real-time over time in a line graph, bar graph and/or text and/or other representative textual and/or graphical format, and the level, severity or priority in relation to the validation state of the process value(s) can be shown in different colors, shading, patterns or a combination thereof (e.g., GREEN (within criteria, compliant, or low priority), YELLOW (warning, within outer limits of criteria, slight deviation from criteria, or middle priority), and RED (outside of criteria, severe deviation or high priority), etc.). In various embodiments, validation criteria can include a plurality of different tolerances for different warning levels related to compliance or deviation of a monitored process value(s) from its process requirements. Accordingly, the operator 12 can customize, configure, select or change presentation/display/audio format and data to be presented before or during the running of the batch.

As further shown in FIG. 1, the operator 12 can configure the batch validation process, including the validation criteria, through the batch configuration page 146 of the HMI 140. The batch configuration page 146 can provide for a validation criteria setup 148 in which the operator 12 can configure settings, via a user interface (e.g., GUI), for the batch validation process, including but not limited to selecting or defining the validation criteria and other settings to be used for batch validation on the recorder unit 100. In various embodiments, the HMI 140 can provide a plurality of predefined batch profiles or PV profiles with validation criteria for selection by the operator 12, can provide a plurality of validation criteria for selection by the operator 12, and/or can allow the operator 12 to input, change, update or upload a profile, validation criteria or batch validation setting.

In FIG. 1, various functions and operations can be performed away from the plant area 10 in which the process 20 is run. For example, in the supervision area 50 (e.g., a control room or facility), the control room operator 52 can remotely configure or define validation criteria for use by the recorder unit(s) 100 for a validation process or perform off-line batch validation on a computer system, such as the desktop workstation 170, which can interact directly or indirectly with the recorder unit 100 via the data server 150.

The data server 150 can be a computer system, which can be communicatively connected to the recorder unit 100, via one or more networks. The data server 150 can be configured to receive validation criteria which is configured, defined or selected by a user via the workstation 170, to save the validation criteria as shown by reference 152 in storage/memory, and to synchronize and save the validation criteria on the recorder unit 100 via the batch settings 120. The data server 150 also can be configured to receive a secure process data recording 130 which includes process data and validation information (e.g., batch validation log 132) from the recorder unit 100 and securely store or record this data on the server as secure process data recording 160 which includes the process data and validation information (e.g., batch validation log 162), which may include information relating to the manual approval/disapproval of a batch from the plant operator 12. The secure processing data 160 can be accessed by the workstation 170 to perform off-line review of the process data and other validation-related information and off-line validation for a batch(es). The batch validation log 162 of the recording 160 also can stored off-line batch validation approval by the operator 52 via the workstation 170.

The desktop workstation 170 can be a computer system, which can be communicatively connected to the data server 150. The workstation 170 can be configured to implement various functions, operations, processes or modules to enable the operator 52 to save or update validation criteria on the recorder unit 100, via the data server 150, and to perform off-line review and validation of process data for a batch(es). These functions, operations, processes or modules (as well as data) can include, but are not limited to offline data management tool 180 which includes functionality such as a batch validation criteria setup 182, a batch off-line validation 184 (e.g., off-line batch validator/reviewer). The offline data management tool 180 can be configured to access the process data (including process value(s)) and validation information stored in the batch validation log 162, and to display such information to the operator 52 for review, such as to show process value(s) and the associate validation information from the recorder unit 100. The offline data management tool 180 also can be configured to show other data such as batch trends, which can be based on historical process data for a plurality of batches performed in the past. The data and information from the offline data management tool 180 can be outputted in a desired visual or audio format. The information provided to the data server 150/workstation 170 can include presentation/display configuration used by the HMI 140 to enable the operator 52 to review the process data and validation information in a similar manner as presented to the operator 12 on the HMI 140.

The batch validation criteria setup 182 can enable the operator 52, via a user interface (e.g., GUI), to configure settings for the batch validation process, including selecting or defining the validation criteria/PV profile(s)/Batch profile(s) and other settings to be used for batch validation on the recorder unit 100. In various embodiments, the HMI 140 can provide a plurality of predefined batch or PV profiles (including validation criteria) for selection by the operator 52, can provide a plurality of validation criteria for selection by the operator 52, and/or can allow the operator 52 to input, change, update or upload a profile, validation criteria or batch validation setting.

The batch offline validation 184 of the tool 180 can be configured to receive a request from the operator 50 to perform automatic validation, and perform off-line validation of process data for a desired batch against or based on batch validation criteria to automatically validate the process data or batch. The tool 180 can employ a batch validation process, similar to that implemented on the recorder unit 100. The batch automatic validation states and result can then be provided to the operator 50 for review. The batch offline validation 184 also can be configured to receive batch validation approval (or disapproval) from the operator 52, and to securely store the validation approval (or disapproval) in the batch validation log 162 in relation to the batch and its process data in the recording 160.

The recorder unit 100, the input/output device such as the HMI 140, the data server 150, the desktop workstation 170 or other devices and systems, as described herein, can be a computer device or system. In various embodiments, the computer device or system can include among other things a processor(s) for controlling/performing the operations of the device or system (including those described herein) and components thereof, memory to store data for use in operating the device or system (including those described herein), and a communication device/interface to enable communication with other devices or systems via wireline or wireless communication. The computer device or system also may include user input/output devices (e.g., touchscreen, display, mouse, keyboard, keypad, etc.) to facilitate interaction with a user and other hardware/software to implement the functions and operations described herein.

It should be understood that the system architecture in FIG. 1 is provided simply as a non-limiting example. In various embodiments, instead of a single recorder unit 100, the system architecture can include a plurality of recorder units 100 for recording and validating a plurality of process batches being implemented sequentially or in parallel in one or more areas of a plant, and a plurality of HMI 140 associated with one or more recorder units 100. A user such as the operator 52 can perform off-line validation or configure validation criteria for these process batches via the desktop workstation 170/data server 150. Furthermore, the various functions and operations described as being implemented by the computer devices and systems (e.g., 140, 100, 150 and 170) in the example of FIG. 1 can be implemented in other similar types of computer devices and systems to implement real-time and off-line validation process and configuration thereof, as described herein.

While the batch validator is shown as being implemented on a data recorder/controller which is responsible for acquiring and recording the process data, it is understood that the one or more of the functions and operations of the batch validator, including the live validation process, can be offloaded and implemented on other computer device(s) or system(s) in a system architecture, including but not limited to the HMI device, an edge device/cloud, a data server and so forth. Accordingly, in other embodiments, the functions and operations described herein for automatic batch validation also can be implemented in a distributed fashion across a plurality of computer devices and/or systems.

Figure 2:
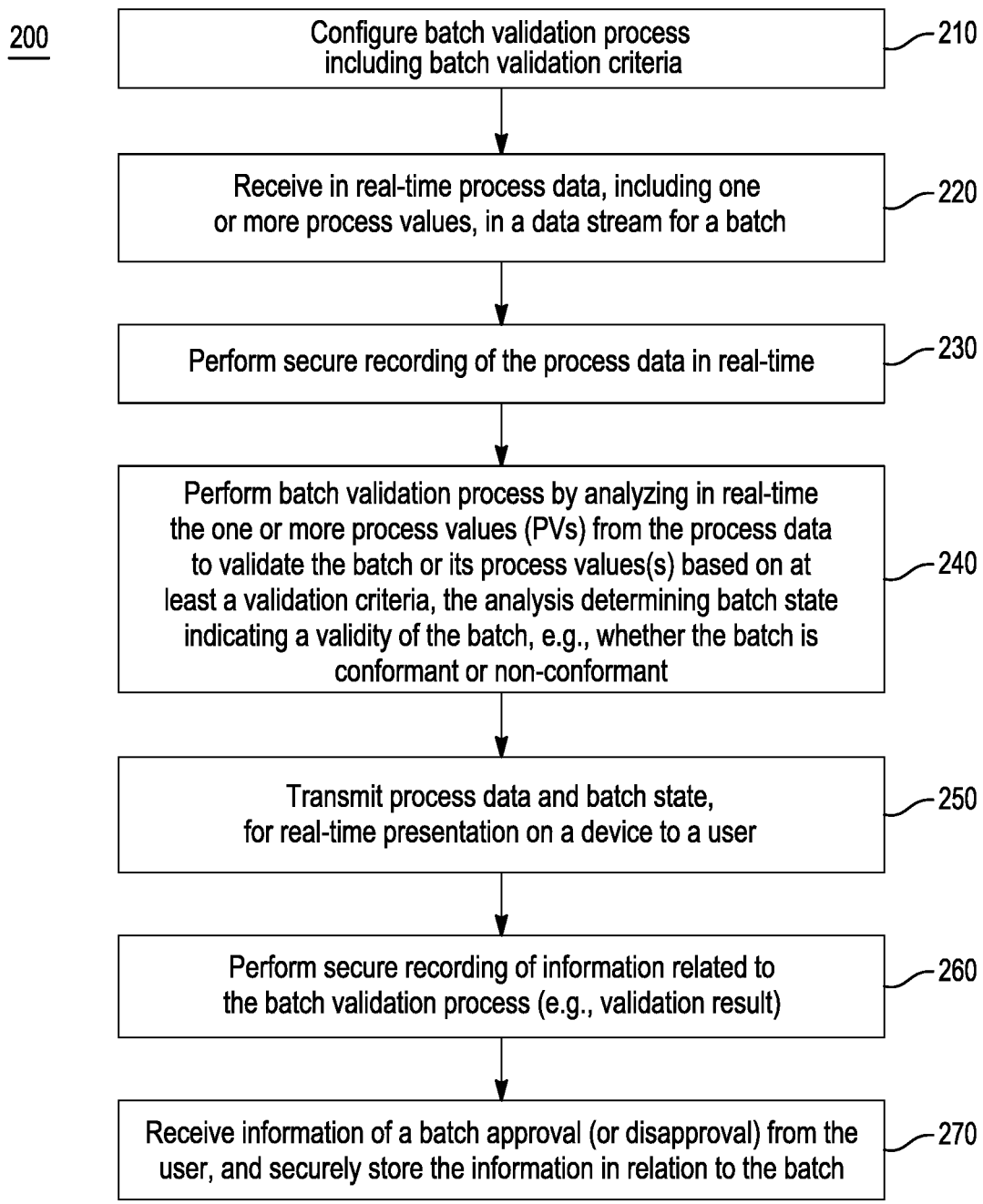
FIG. 2 illustrates an example process of implementing real-time recording and validation of process data for a batch, in accordance with an embodiment of the present disclosure.

FIG. 2 illustrates an example process 200 of implementing real-time recording and validation of process data for a batch, in accordance with an embodiment of the present disclosure. For the purposes of explanation, the process 200 will be described with reference to a computer device or system, which is responsible for recording process data, such as for example a process data recorder/controller.

The process 200 begins at block 210 in which the process data recorder/controller configures a batch validation process (including batch validation criteria) to be implemented for a process batch. The configuration can include the selection of the batch validation criteria, batch profile or PV profile(s), which includes a batch validation criteria and other information, to perform automatic batch validation. The batch validation criteria also can be pre-configured, pre-defined or pre-selected for use, such as by a user, for a specific process batch or category/type of batch to be run.

At block 220, the process data recorder/controller receives process data, such as one or more process values, in real-time. The process data can be a live data stream of process value(s) of the running batch over the course of its execution. The process data recorder/controller can determine the start of a batch process according to user input, information from the control system controlling the batch process, or can analyze the process data to determine the start of the batch based on batch or PV profile for the type of batch running.

At block 230, the process data recorder/controller performs secure recording of the live process data, including the one or more process values. The process data can be securely recorded in a tamper-resistant file or storage or a combination thereof.

At block 240, the process data recorder/controller performs real-time automatic batch validation processing on one or more process values (PVs) or a subset of process values from the process data for a running process batch based on or against the validation criteria. The validation of the process data can include live identification of a validation state of whether the process data or one or more process values therefrom are within process requirements, conformant/normal/non-deviating or non-conformant/abnormal/deviating. The state of the batch can further indicate a level, priority or severity of conformity of the batch or its process value(s).

At block 250, the process data recorder/controller can transmit live process data and live validation information, including a validation state of the batch or its process value(s), for real-time presentation on a device to a user. For example, real-time monitoring of the process batch can be visualized or presented on the HMI for the data recorder/controller as well as on any web-compatible device (e.g., personal computer or PC, tablet, smartphone, etc.) connected on the same local network as the recorder/controller. The validation state can include live validation process outcomes, which can be transmitted to the user.

The level, severity or priority of the validation state of the live process data or its process value(s) can be displayed on the device in a manner that is easily recognized by the user (e.g., differentiated by color, pattern, sound, etc. or a combination thereof) and can alert the user when the validation state/result is non-conformant. In this way, the user can monitor in real-time the process value(s), such as for example operating parameters of the batch, and take action during the running of the batch or after the batch process is finished. For example, the user can terminate/restart or pause a running batch in the event that the real-time monitored information indicates that the validation state of the batch is non-conformant, e.g., does not comply with desired operating standards or guidelines as defined by the validation criteria.

At block 260, the process data recorder/controller can perform secure recording of any information related to the validation process, such as for example validation information including validation result and, if desired, the validation state of the batch or its process value(s) over the course of the batch process. The validation information can be securely stored in relation to the process data, such as in a validation log, which can include date and time associated with the validation information.

At block 270, the process data recorder/controller can receive information of a batch approval (or disapproval) from the user, and securely store this additional validation information in relation to the batch. For example, after the batch has ended, the user can input an approval (or disapproval) of a batch on the device (e.g., HMI, web-compatible device, etc.), which in turn is transmitted to the process data recorder/controller for secure storage in the validation log in relation to process data for a corresponding batch. The validation information or information in the validation log can be annotations provided with reference to the stored process data.

As discussed previously herein, the process data and validation log also can be accessed by a user to perform off-line review and validation on a remote computer device or system.

Figure 3:
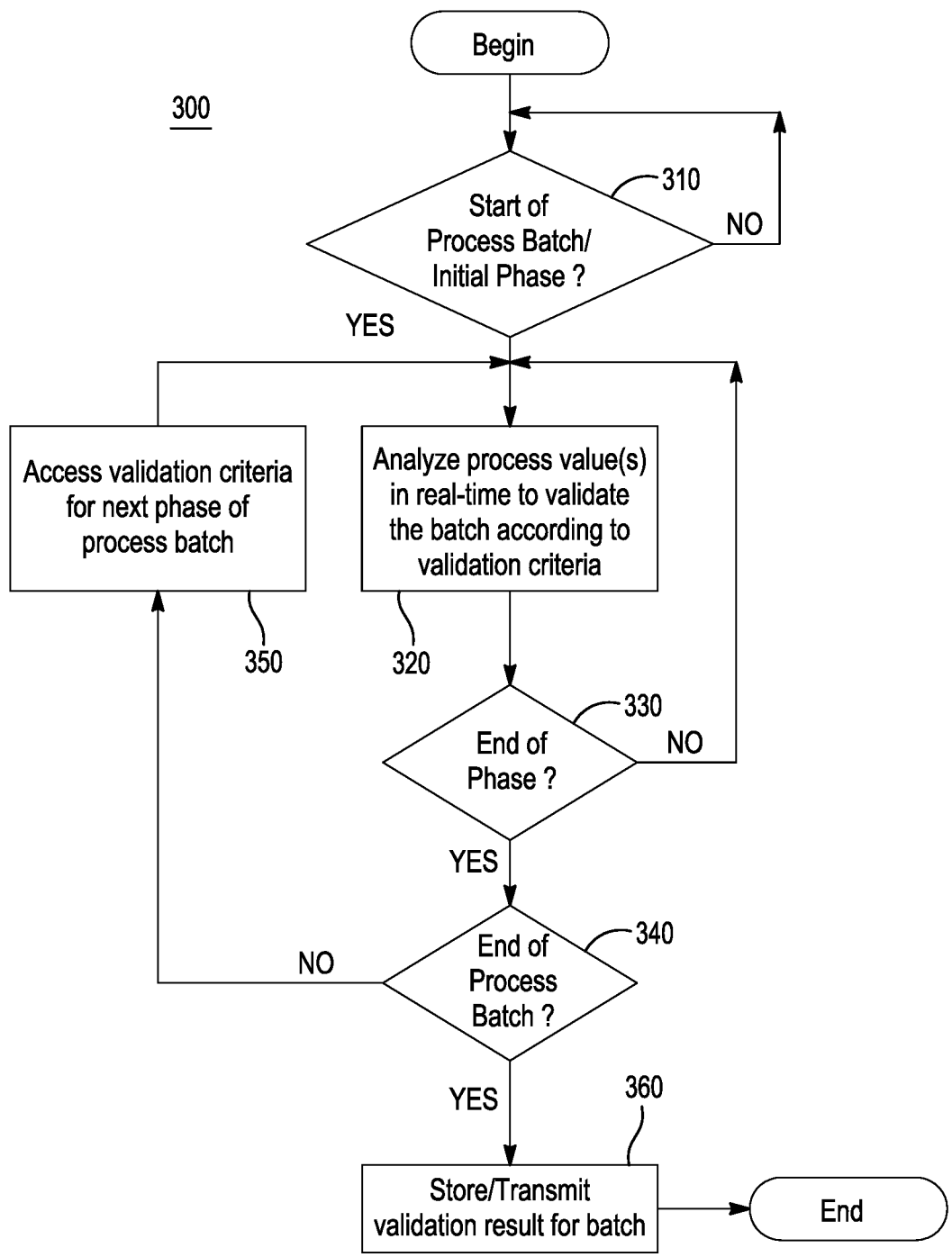
FIG. 3 illustrates an example batch validation process, in accordance with an embodiment of the present disclosure.

FIG. 3 illustrates an example batch validation process 300, in accordance with an embodiment of the present disclosure. For the purposes of explanation, the process 300 will be described with reference to a computer device or system, which is responsible for recording process data, such as for example a process data recorder/controller.

The process 300 begins at block 310 in which the process data recorder/controller determines if the process batch is started. The process data recorder/controller can determine the start of the batch according to or based on information relayed to the recorder/controller, such as a user input (e.g., input to start the batch) or notification of the start from the control system controlling the batch process. The process data recorder/controller also can determine the start of the batch according to or based on process data, in view of a batch profile for the batch. If the batch has started, the process 300 proceeds to block 320. Otherwise, the process data recorder/controller continues to wait until the start of the batch.

At block 320, the process data recorder/controller performs automatic validation of the batch or its process data. The automatic validation can include analyzing the process value(s) (e.g., batch-specific process value(s)) to validate the batch or its one or more process values thereof in real-time based on the validation criteria. Based on the analysis, the process data recorder/controller can generate real-time validation information, which can include a current validation state of the one or more process value(s) or the batch. The live validation state can indicate whether a process value(s) is conformant/normal/non-deviating or non-conformant/abnormal/deviating from process requirements in view of the validation requirements. The state of the batch can further indicate a level, priority or severity of conformity of the batch or its process value(s).

At block 330, the process data recorder/controller determines whether the phase (e.g., phase, segment, cycle, etc.) of the batch has ended. The process data recorder/controller can determine if the phase has ended according to or based on information relayed to the recorder/controller, such as a user input (e.g., input to move to the next phase, end the batch, etc.) or notification of the end of the phase from the control system controlling the batch process. The process data recorder/controller also can determine the end of phase according to or based on process data, in view of a batch profile for the batch. If the phase is determined to have not ended, the process 300 proceeds to block 320 in which the process data recorder/controller continues to perform automatic validation on the process data using the validation criteria for the particular phase.

If the phase is determined to have ended, the process 300 proceeds to block 340 to determine if the batch has ended. The process data recorder/controller can determine if the batch has ended according to or based on information relayed to the recorder/controller, such as a user input (e.g., input to end the batch, etc.) or notification of the end of the batch from the control system controlling the batch process. The process data recorder/controller also can determine the end of batch according to or based on process data, in view of a batch profile for the batch. If the batch is determined to have ended, the process 300 proceeds to block 360 in which the process data recorder/controller can determine (if not already) the validation result for the batch, such as conformant (e.g., pass, etc.) or non-conformant (e.g., fail, etc.), and securely store the validation result for the batch such as in a validation log and also transmit the validation result for presentation to a user. The validation result can be determined based on the validation state over the course of the batch process, e.g., such as by the amount and/or severity of non-conformant or deviation events, during or after the batch process. Thereafter, the process 300 ends.

Turning back to block 340, if the batch is determined to have not ended, the process 300 proceeds to block 350 to access or obtain validation criteria for the next phase of the batch. Thereafter, the process data recorder/controller performs automatic validation of the process value(s) with the accessed validation for this next phase at block 320. The process 300 continues to implement blocks 320, 330, 340 and 350 for each subsequent phase of the batch, until the batch has ended. As explained above, when the batch is determined to have ended, the process proceeds to block 340 in which the process data recorder/controller can determine (if not already) the validation result and store/transmit the validation result for the batch.

Accordingly, in various embodiments, the batch validation criteria for a batch may include a sequence of validation criteria for each phase of the batch. In various embodiments, each phase of the batch may or may not require validation which can be defined in the particular phase validation criteria.

Figure 4A:
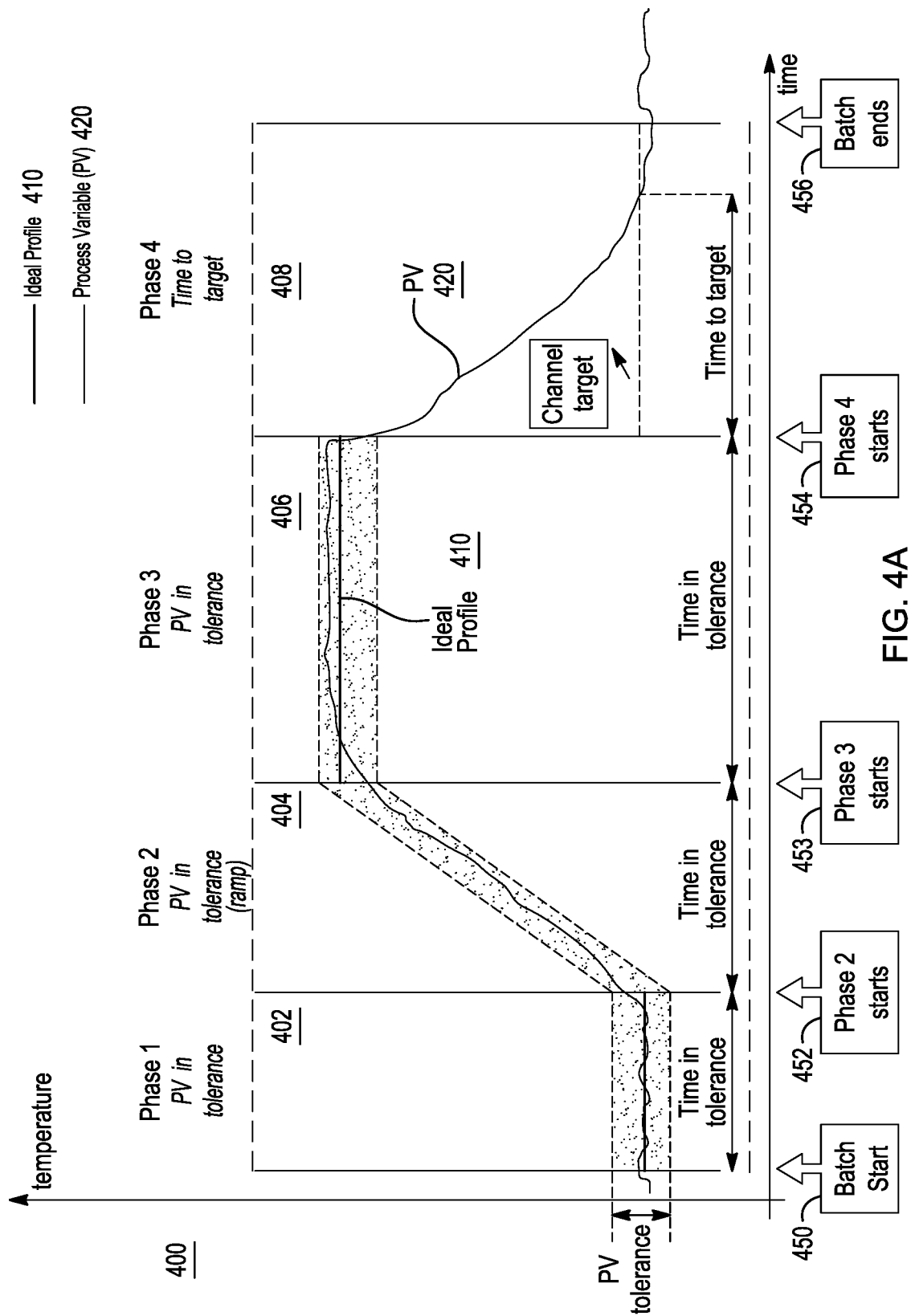
FIGS. 4A and 4B illustrate examples of graphs showing a validation ideal profiles a process batch over time, and process data such as a process value or PV of the process batch over time, in accordance with an embodiment of the present disclosure.
Figure 4B:
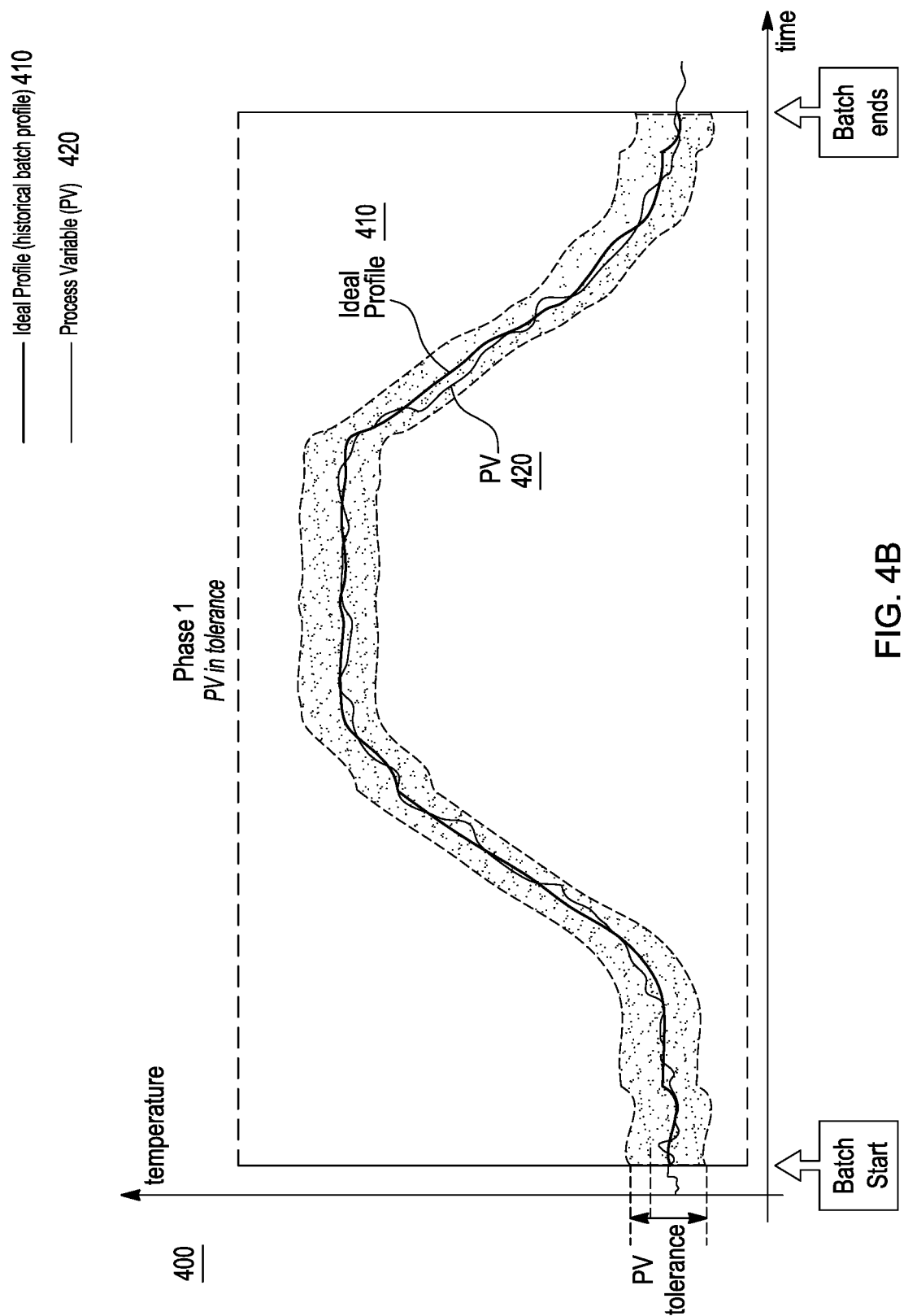

FIGS. 4A and 4B illustrate examples of profiles 400 for a process value (PV) of process data for a batch process, in accordance with an embodiment. The profile 400 of FIG. 4A includes an ideal profile 410 (defined by a discrete set of validation parameters per phase, e.g. ideal value, tolerances, ideal time to target) of a process batch over time, and is separated into four (4) phases (e.g., phases, segments, cycles, etc.) 402, 404, 406 and 408. Each phase may have a validation criteria, such as a PV-related tolerance(s) and/or a time tolerance. In some embodiments, the PV 420 can be used to identify the start and end of the batch process and transitions between each phase therebetween. In other embodiments, configured time thresholds can be used to identify the start and end of the batch process and transitions between each phase therebetween. For example, this information can be used by the batch validation process to control the validation process and to apply appropriate validation criteria to each phase. In this example, the process value is temperature. The profile 400 of FIG. 4B includes an ideal profile 410 defined by a historical batch profile previously recorded (e.g. recorded by the same device). In this example the validation is evaluated by comparing the process value 420 with the selected historical batch profile. In both examples of FIG. 4A and FIG. 4B, the batch validation succeeds if the PV remains within the PV tolerance defined by the ideal profile 410 plus and minus configurable tolerances and/or if the PV reaches the target within the expected ideal time target.

For the purposes of explanation, example process data, such as a process value 420 of a channel input of the process batch, is shown over the course of the batch process. This example illustrates an example validation process for a batch process, which begins with the phase 1 at batch start 450, continues to phase 2, 3 and 4 after a configured time and/or when PV reaches a configured threshold (452, 453, 454), and finally is completed with the batch end 456. In this example, the batch process is segmented into phases 402, 404, 406 and 408. At the batch start 450, the live batch validation is initiated. The process value 420 is analyzed in the phase 402. In this phase, the process value may be analyzed against a constant value tolerance (e.g., channel tolerance) and/or a time tolerance (e.g., maximum and minimum time) to identify compliance or any deviation from process requirements of the phase 402. As shown, the process value stays within the channel tolerance (1) at the start of the batch process in the initial phase.

Subsequently, the process value 450 exceeds the channel tolerance which identifies the transition to the next phase 404, and increases to approach a target value. In this phase, the process value may be analyzed against a rate/ramp tolerance and/or a time tolerance (to target) to identify compliance or any deviation from process requirements of the phase 404. When the process value reaches the channel tolerance (3), the next phase 406 begins in which the process value is to be maintained within the channel tolerance for a period of time. In this phase, the process value may be analyzed against a constant value tolerance (e.g., the channel tolerance) as well as a time tolerance within the phase (e.g., sterilization phase) to identify compliance or any deviation from process requirements of the phase 406.

Afterwards, the process value is shown as decreasing outside the channel tolerance, which indicates a transition to the next phase 408, in which the process value 420 is shown as decreasing until it reaches the channel target of the setpoint 410. In this last phase 408, the process value may be analyzed against a rate/ramp tolerance and/or a time tolerance (to target) to identify compliance or any deviation from process requirements of the phase 408.

In the example batch process of FIG. 4A, validation criteria can be defined for one or more of the phases 402, 404, 406 and 408 such as, for example, constant value tolerance, rate/ramp tolerance and/or time tolerance. For example, depending on the application, a constant or variable value tolerance as well as time tolerance may be defined or set for the validation criteria for phases 402 and 406, and ramp/rate tolerances as well as a time tolerance may be defined or set for the validation criteria for phases 404 and 408. For example, in certain applications, it may be critical to have the temperature increased, such as in phase 404, to a desired target temperature within a particular time frame. As such, a ramp/rate tolerance and/or time tolerance may be applied as the validation criteria for phase 404. In another example, it may be critical to maintain the temperature, such as in phase 406, for a period of time. As such, a constant value tolerance and a time tolerance can be applied as the validation criteria for phase 406. In the example batch process of FIG. 4B, validation criteria can be defined by a recorded historical batch PV profile. In some embodiments, the historical batch PV profile can be recorded by the same device performing the validation and selected as ideal validation profile when the batch validation criteria are configured. In other embodiments, the historical batch PV profile can be downloaded into the device from another device (another controller/recorder or a personal computer). For example, depending on the application, an historical batch executed in ideal conditions or related to consequent conformant manufacturing outputs may be taken as refence, i.e. as ideal profile, for the following batch iterations.

In various embodiments, the batch validation process can employ batch validation criteria that can enable the determination of different levels, priority or severity of compliance or deviation from process requirements. For example, the batch validation criteria for a phase can include different levels of tolerances, e.g., different tolerance ranges or thresholds for a monitored PV value, PV-related rate, PV-related time and so forth for a phase of the batch process.

Figure 5:
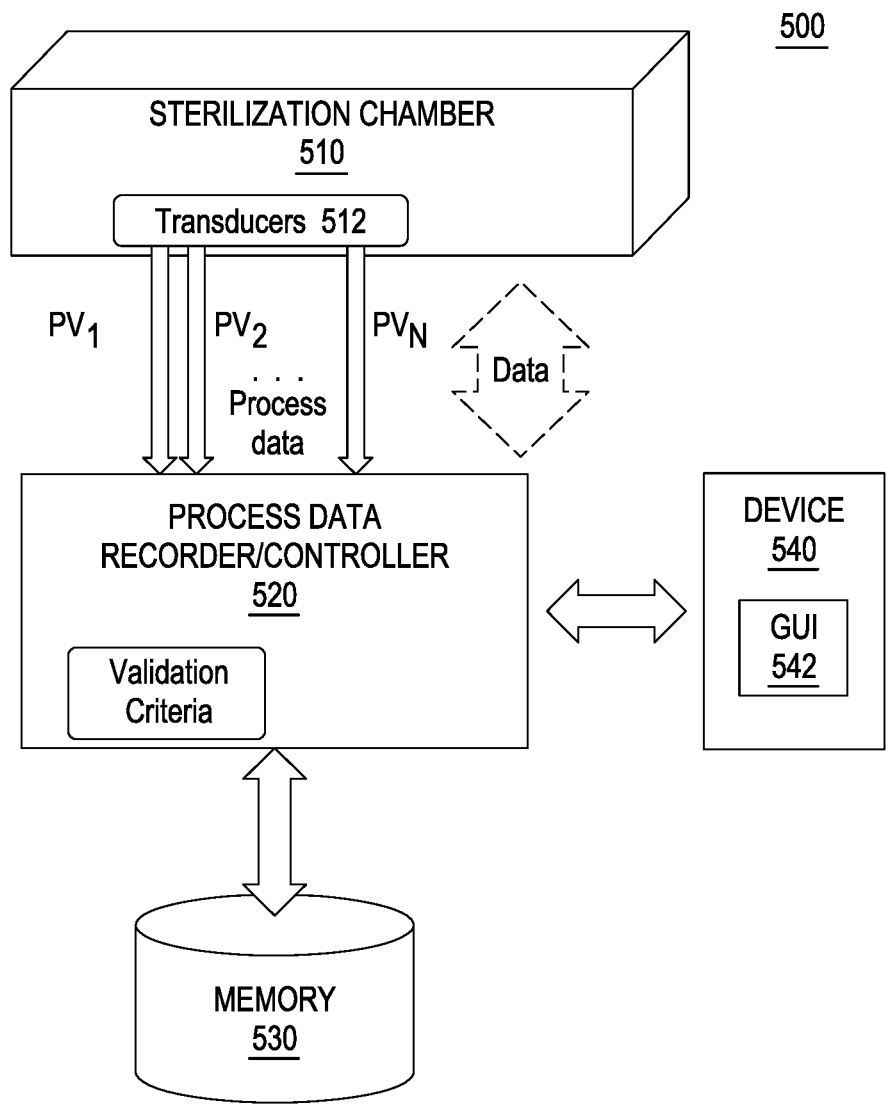
FIG. 5 illustrates an example of a system environment, including a process data recorder and/or controller, for acquiring, storing and validating process data for a sterilization process, in accordance with an embodiment.

FIG. 5 illustrates an example of system environment 500 for acquiring, storing and validating process data for an application such as a sterilization process, in accordance with an embodiment. In the environment 500, a digital process data recorder/controller 520 can interact with a sterilization chamber 510 or components associated therewith to perform automatic batch validation of a batch process for a heat treatment application such as sterilization. As shown, the sterilization chamber 510 can include various sensors for monitoring process values (PVs), such as temperature and pressure in the chamber. In various embodiments, the transducers 512 can include temperature transducer(s) for monitoring temperature at one or more locations in the chamber 510, pressure transducer(s) for monitoring pressure in the chamber 510, and other transducers for measuring other process value(s) or measuring characteristics or properties of the batch process from which to compute, calculate, derive, determine or obtain measurements of other process value(s).

As further shown in FIG. 5, the recorder/controller 520 can receive as inputs a plurality of process values (PVs) on a plurality of channels inputs (e.g., where N is the number of input channels or PV inputs) from the transducers 512. The recorder/controller 520 can store or maintain sterilization configuration parameters, including validation criteria, for the sterilization process batch in order to perform real-time automatic batch validation for the sterilization process.

The recorder/controller 520 also can include a plurality of input/output (I/O) terminals. These I/O terminals can receive user wiring to facilitate customized device configurations and interconnections. The recorder/controller 520 can provide (e.g., output, transmit, etc.) a current process value (or average of process values) and validation state to a device 540, such as a user operable device, as well as the validation result (or outcome), for real-time presentation to a user. The recorder/controller 520 also may be configured to store process data and validation information, including validation state over the course of the batch process and the validation result in a memory 530. The memory 530 can be a local memory, which is part of the process data recorder/controller 520 or communicatively connected to the process data recorder/controller 520 over a local network.

In various embodiments, the recorder/controller 520 can be a controller for the batch process, which can receive/acquire information from equipment associated with the sterilization chamber 510 to control the operations of the batch process and facilitate operation of the validation process performed on the recorder. The recorder/controller 520 also can take the form of a separate recorder device(s) and a separate controller(s), or can be integrated into a single device or system. The various operations of the recorder/controller 520, including the process data acquisition, process data recording, validation analysis on a batch process(es) and so forth, can be performed at the point of real-time process data acquisition, such as from the transducers 512. The recorder/controller 520 can be a computer device or system, such as described herein.

As further shown in FIG. 5, the device 540 can include a graphical user interface (GUI) 542 to display, among other things, real-time process data such as process values and validation data/information, in accordance with an embodiment. For example, the GUI 542 can provide for different graphical output formats, which may employ different colors or patterns, to display and reflect the state of one or more PV inputs, such as conformant or non-conformant as well as a level, severity or priority of such conformity or non-conformity. GUI 542 also can provide for the output of whether a processing/processed batch is conformant or non-conformant.

Accordingly, a user, such as an operator, can monitor in real-time the process value(s), validation state of each of the process value inputs in relation to validation criteria, the current cycle state and the amount of time associated with the current cycle (e.g., Wait Start, Waiting, Equilibration, Sterilization, etc.) or other cycle(s) in the batch process, and any other relevant information related to the operation and validation of the batch process. In this way, the user can identify when the batch or its process value(s) are non-conformant or conformant. In the event that they are non-conformant or significantly conformant, the user can take action, such as report the non-conformant batch, manually disapprove the batch, terminate the batch (if running) and restart the batch, and so forth.

Figure 6:
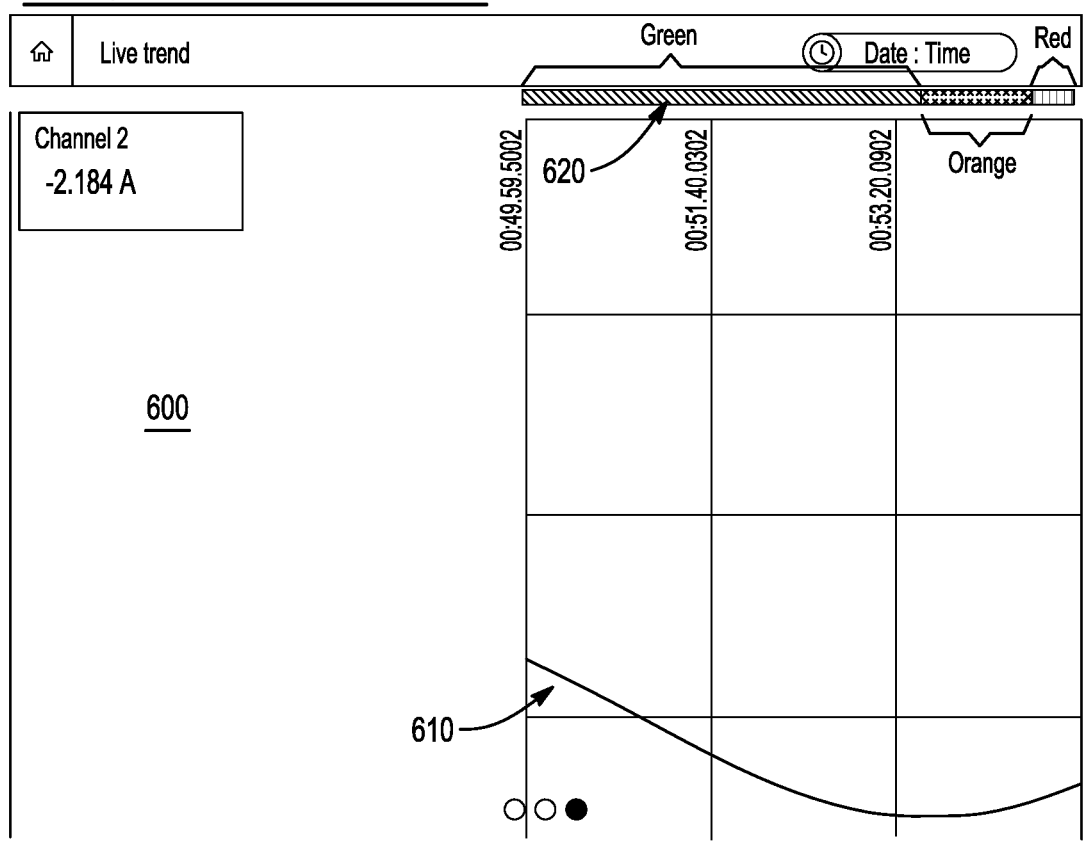
FIGS. 6, 7 and 8 illustrate different display formats for process data and validation data/information over time for a process batch on a graphical user interface, in accordance with embodiments of the present disclosure.
Figure 7:
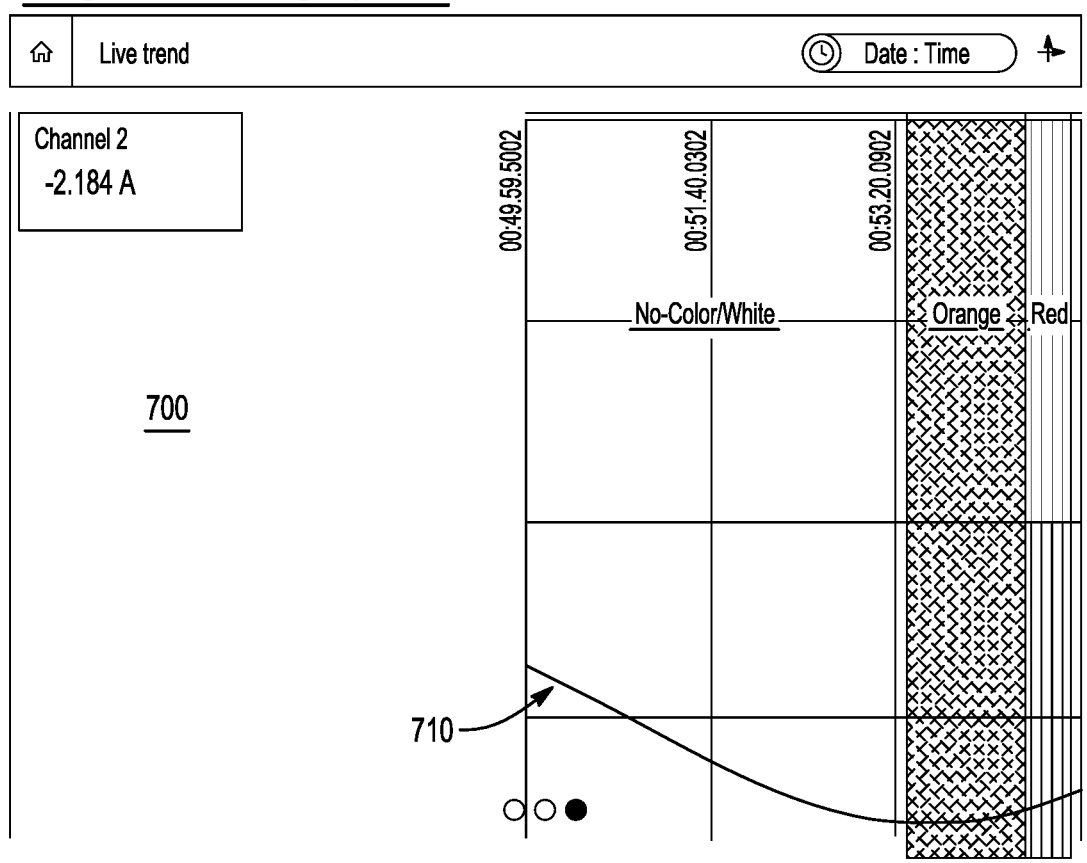
Figure 8:
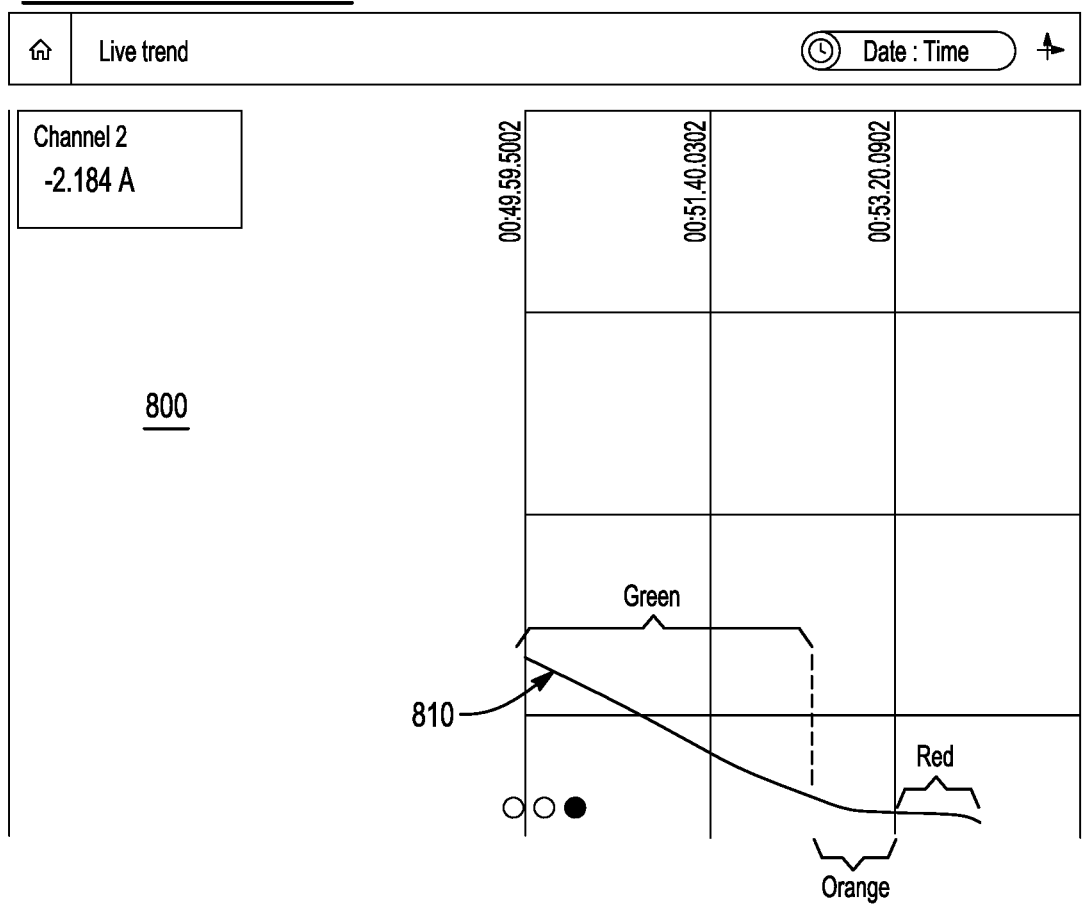

FIGS. 6, 7 and 8 illustrate different display formats 600, 700 and 800 for process data and validation information (e.g., validation state) over time for a process batch on a graphical user interface, in accordance with various embodiments of the present disclosure. The display can present a live or historical trend of a monitored state of a PV(s) for a visible time-window associated with a batch process. Persistence of result, e.g. in the case of a batch failure, can be provided via alarms.

FIG. 6 shows a display format 600, referred to as an analysis result bar option, in which a value of the PV input channel is shown as a graph over time as reference 610, and a bar is shown as reference 620. The color of the bar 620 can change to reflect the different level, severity or priority of the validation state of the process value over time (e.g., green is compliant/valid, orange is deviation warning, and red is severe deviation, etc.).

FIG. 7 shows a display format 700, referred to as the region shading option, in which a value of the PV input channel is shown as a graph over time as reference 710, and a shading is shown to reflect the severity or priority of the validation state of the process value over time (e.g., green is compliant/valid, orange is deviation warning and red is severe deviation, etc.).

FIG. 8 shows a display format 800, referred to as the pen color option, in which a value of the PV input channel is shown on a graph over time as reference 810, and the color of the PV graph is shown to reflect the severity or priority of the validation state of the process value over time (e.g., green is compliant/valid, orange is deviation warning and red is severe deviation, etc.).

Figure 9:
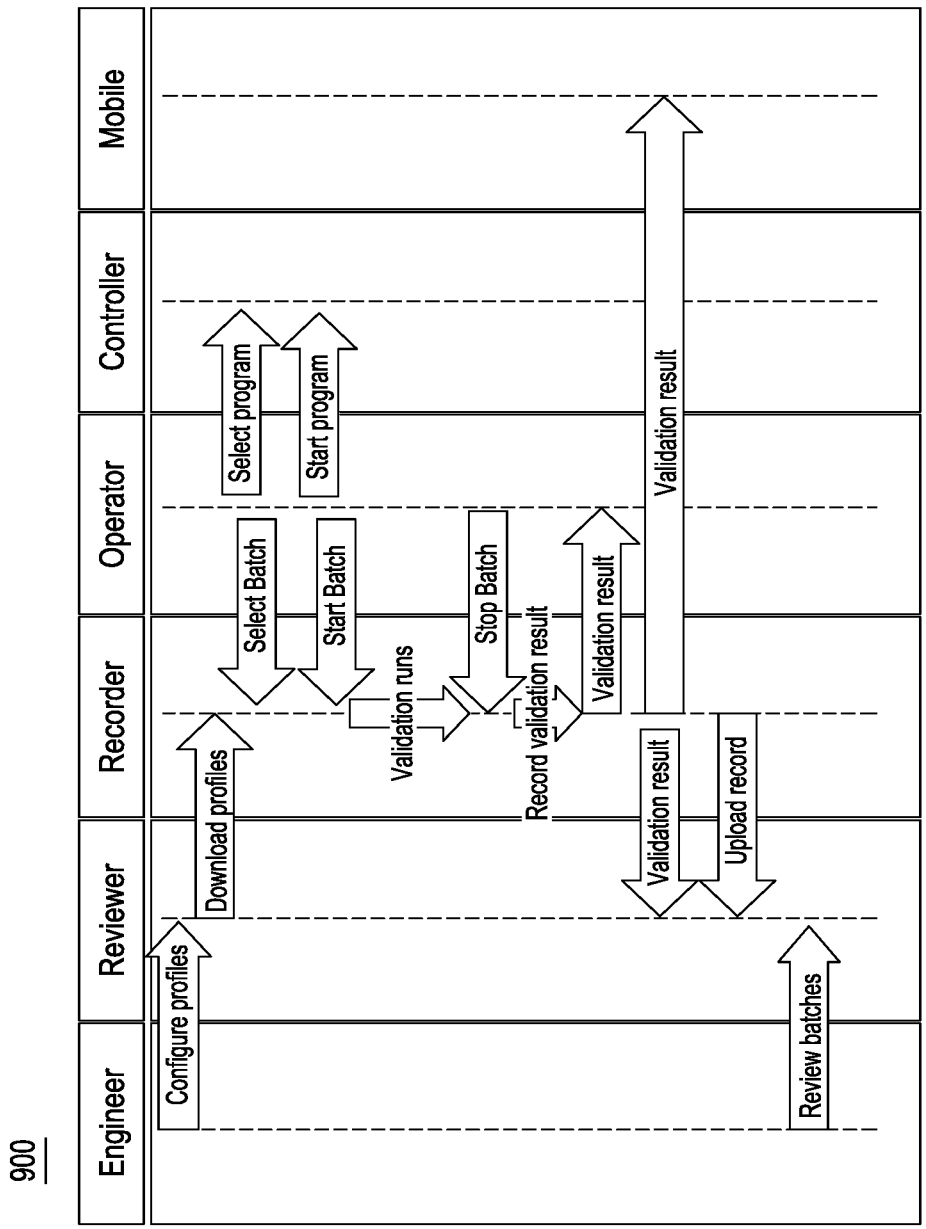
FIGS. 9, 10 and 11 illustrate different workflow examples related to the validation process for a batch, in accordance with embodiments of the present disclosure.
Figure 10:
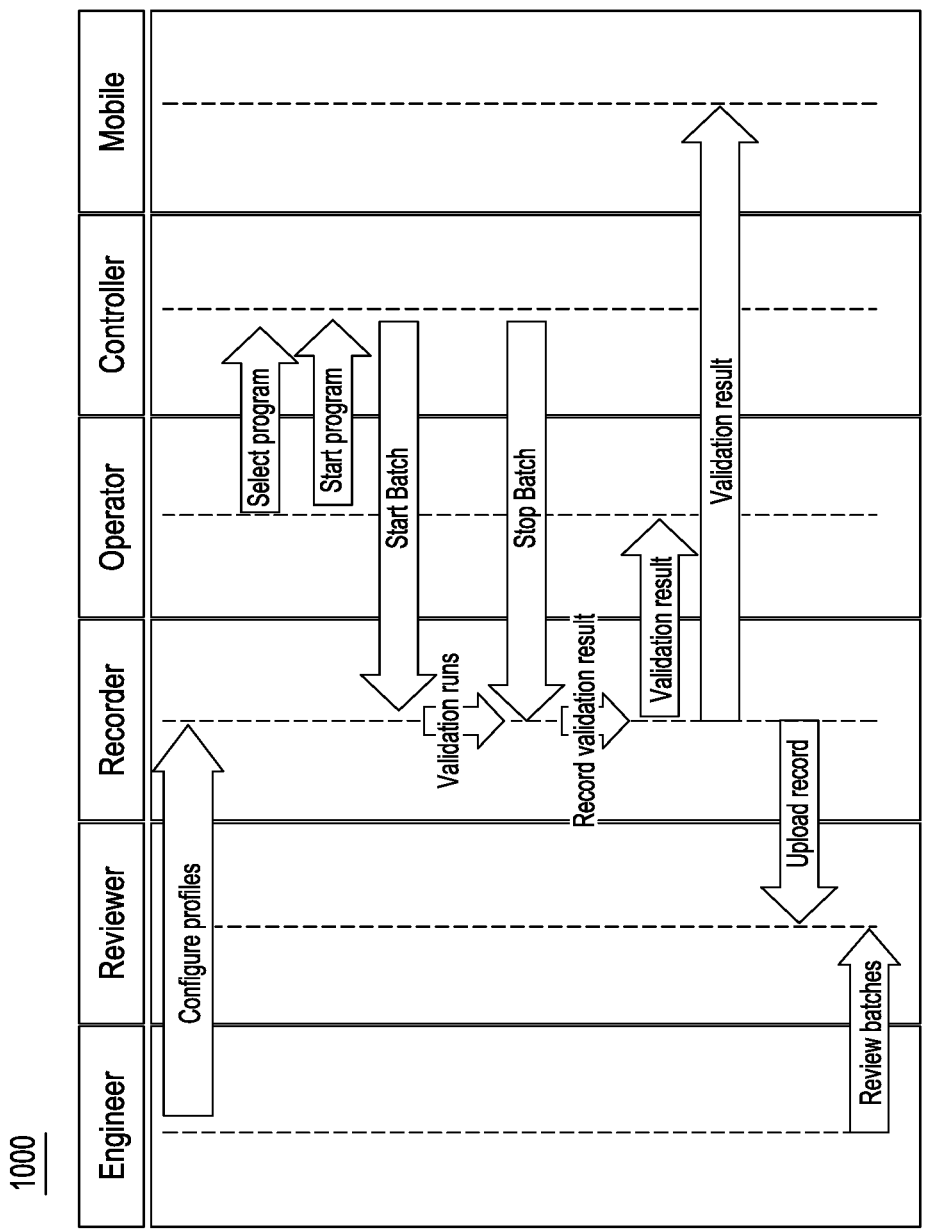
Figure 11:
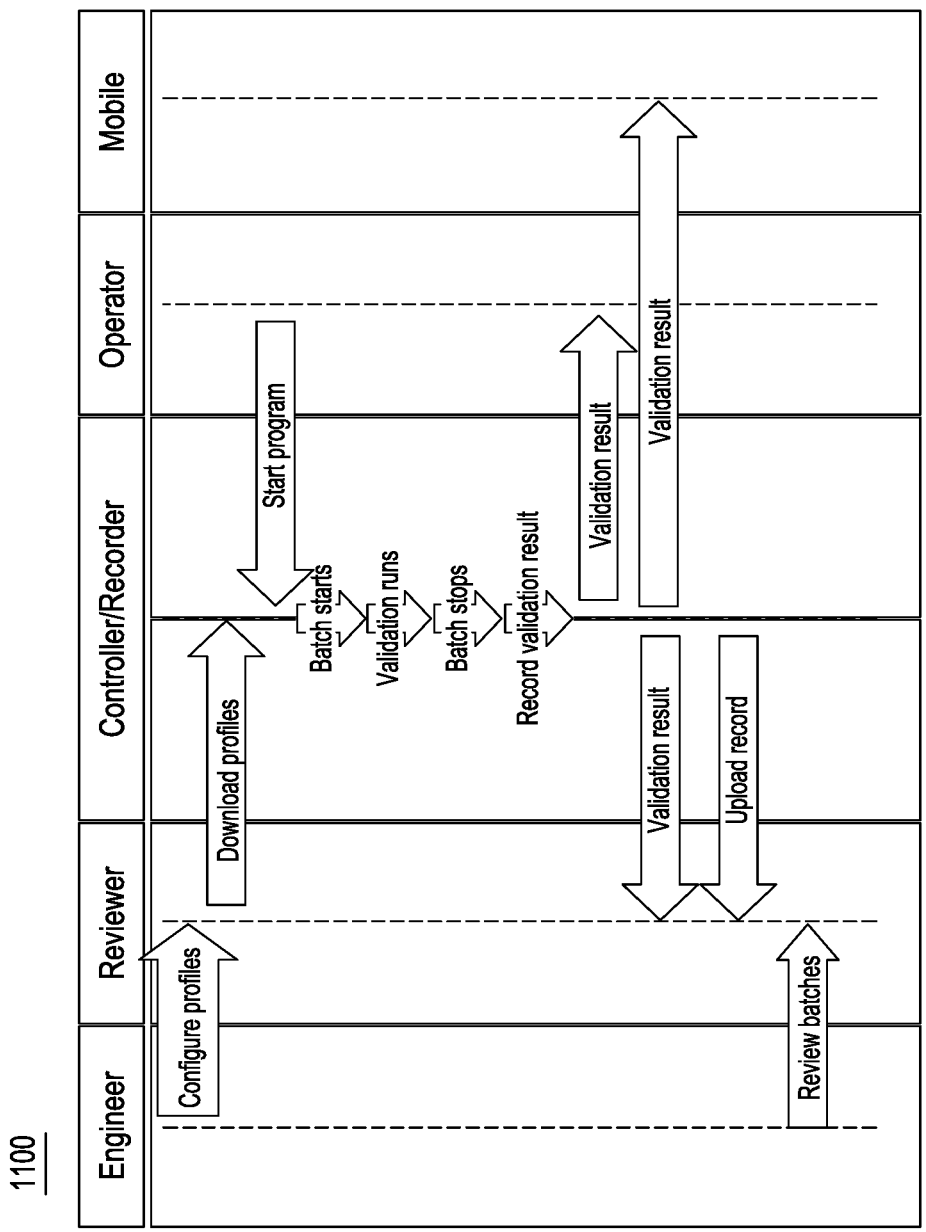

FIGS. 9, 10 and 11 illustrate different examples of workflow 900, 1000 and 1100 respectively related to the validation process for a batch, in accordance with embodiments of the present disclosure. For the purposes of explanation, in these workflow examples, there is an engineer (e.g., operator 52 in FIG. 1), reviewer program or tool (e.g., tool 180 in FIG. 1), recorder and/or controller (e.g., recorder unit 100 in FIG. 1, recorder 520/controller 530 in FIG. 5), operator (e.g., operator 12 in FIG. 1) and mobile device (e.g., smartphone, tablet, laptop, etc.). These workflows 900, 1000 and 1100 show different operation flows from the configuration of the profile(s), to the selection of batch validator program/profile/batch, to the start and end of the batch validator program and the batch (including the validation run), to the validation results and transmission/storage thereof, and to the review of the batches and their information by an engineer, e.g., for manual approval or disapproval.

The above describes various example embodiments related to the validation, storage and presentation related to validation of one or more batches. It should be understood that various aspects and features can modified, varied or changed while still providing for real-time validation.

In various embodiments, the batch validator feature can target a "live" comparison against standards or criteria. A live determination of pass/fail, and the recording of the result, can remove the need to overlay the assessment on a historic batch record. It also can provide a means to enable automated approval of a batch. The user can defines a conformance profile for a batch based on the requirements/needs for an application. The customer can configure the tolerance and behavior when deviations occur (e.g. take actions such as generate an alarm, trigger a job, etc.).

When a batch has been started, there is live comparison between the current batch and the conformance profile. This is optionally visually presented to the user. Messages are optionally recorded in the process record indicating if the batch is deemed to have passed or failed. The batch validator can include a profile check function to perform automated monitoring of a batch against a specified profile. The monitoring can be on either single or groups of PVs to determine the validation status of a batch, e.g., PASS or FAIL/MANUAL REVIEW. A validation analysis result can be made available on live trends via either status bar indicator, region shading, or differing pen color. This result can be stored such that it could optionally be displayed on a historical trend or batch report. The status of the current batch can be optionally available on a dashboard batch summary widget. The batch validation analysis result can be optionally recorded as an annotation, by marking points of deviation when they occur and an end of batch result. This annotation can be visible in the offline validation reviewer tool once its database receives the batch record/history.

The validation/validator profile can be configurable based on using user-defined criteria/standards. A profile can comprise of a single or multiple PVs. A validator profile can be comprised of single or multiple PVs profiles and can be split into phases (e.g., phases, segments, cycles, etc.) for analysis. Each PV profile can allow for user-defined batch phases with associated tolerances. These tolerances can represent bounds within which the process is expected to operate. Phase analysis can be supported on each PV. Such analysis can include: (1) no analysis, (2) upper and lower bound for a specified reference PV: parametrized constant, parametrized ramp rate, PV within the same group; and (3) minimum and maximum time in phase. Process tolerances can support asymmetry (e.g., differing positive and negative tolerances). Tolerances can support asymmetry (e.g., differing positive and negative tolerances). Excursion of profile check tolerances can be capable of being linked to actions/jobs/alarms at the profile level. Batch phases for the profile check function can allow for multiple tolerances. Phase progression can be via either user input, time, PV setpoint reached, or application parameter (e.g. comms input/OPC unified architecture (UA) or SPP phase). The profile can be loaded and saved. The profile definitions can be exchanged with the Offline data management tool end-of-batch validation feature. An end-of-batch validation feature also can be provided as part of Reviewer.

To facilitate configuration, a template profile can be provided for different applications, such as sterilizer application, independent monitoring system for a washer/disinfector application, etc. The profile can be configurable according to the setpoint profile of the batch process. The profile also can be overlaid on a historical trend when reviewing a batch. The profile also can be overlaid on a batch report's historical trend. Batch profiles can be imported or deployed through the data offline management tool.

In various embodiments, the batch validator can perform profile phase analysis for one or more process, which can include, for example, pulse counting (including variable number of pulses), speed/rate-based criteria, improved excursion analysis (e.g. total duration of excursions, number of excursions, etc.), application specific release criteria (e.g., in Life Sciences, etc.), and analysis parameters which are "wired" from other application parameters.

The batch validator can allow users to assess, through the patch process, whether the batch is within specification. The batch validation function can perform live monitoring of a batch against user-specified profile/criteria. The profile monitoring can utilize a subset of process values in a group to determine the outcome of a batch. The batch validator start trigger can be lines to the batch start of the group it is assigned to. As an alternative or addition to manual inspection methods, an end of Batch comparison feature can be provided, where customers can verify the compliance of executed batches against their applicable standards or criteria.

A "live" batch comparison feature can be provided, where customers can benefit from seeing the compliance of the executing batch against previous batches that have met applicable standards or criteria, and any deviations being flagged as they start to occur. The batch validator can provide a validation result that indicates or requires a manual review in case of batch paused, stopped or device has power cycled.

Phase analysis can be supported on each PV. This includes: (1) no analysis, (2) upper and lower bound for a specified reference PV: parametrized constant, parametrized ramp rate, PV within the same group; and (3) minimum and maximum time in phase. Phase progression can be via either: user input, application parameter (e.g., comms input/ OPC UA or SPP phase), automatic based on time or PV setpoint reached (single or multiple PVs in AND logic).

At production time, validation profiles can be assigned to each batch instance. The selection can be made from a user pre-configured set of validation profiles associated and compatible with the batch. The pre-configured set of validation profiles available for selection may be a sub-set of all the compatible ones.

Excursion of defined tolerances can be capable of being linked to actions/jobs/alarms at the validator profile level for each group it is assigned to. An assessment, such as PASS/ FAIL or the like, is provided at the end of the batch, having configured and executed in runtime the live batch validation.

The batch validator display can allow the user to confirm the compliance of any completed batch against the selected specification, by detailing excursions and any other non-conformity. The analysis result of the validation process can be optionally visible on live trends via either status bar indicator, region shading, or differing pen color. The profile validation status of a current batch can be shown on a dashboard batch summary widget. A method can be provided for the operator to monitor the progression of the batch within the validation profile with a view on the overall validation profile. The batch validator analysis result and validation profile can be optionally displayed on a historical trend or generated batch report.

The live batch validator on the recorder can have the same validation criteria of the offline batch validator on the reviewer. Process definitions can be saved, exported and exchanged through the offline batch validator. The batch analysis end result and excursion messages can be visible in Reviewer (e.g., a data review tool/program) once its database receives the batch record/history. In the context of a batch with validation criteria, to allow Reviewer to produce the same trend presentation (e.g., status bar indicator, region shading, or differing pen color), the information/settings also are recorded.

The options for recording validation results and excursion can be: record only excursions as messages, or record excursions and end of batch result as messages. If the batch result automatic message option is active, then the recorded result can be: pass or manual review required/fail. As part of the recorded conclusions, the profile validation criteria can be stored as well. Users may change the validation profile later and use it for new batches.

Example Configurations

In various embodiments, the Batch validator core functionality can support one or more inputs (e.g., PV inputs) to be validated. The number of inputs can be either user-configurable or derived from an upstream user function such as batch or recording group. All validation profiles for different inputs can have the same number of phases. The number of phases in a validation profile can be user-configurable. The batch validator core can support and load one multi-PV validation profile at the time. Validation profiles for distinct inputs can execute synchronously (e.g., all Input profiles have same number of phases in a given profile and phase progress is synchronous). Phase progression can be defined by the user Transition types. Distinct transition types can be set for each phase. Options can include:

| Name | Extended Name | Value | Description |
| --- | --- | --- | --- |
| AllinputsAndTime | All input completions and time completions | 0 | Transition to next phase happens when both: all the configured value-based completion criteria are met (excluding the ones that are off), and the configured time-based completion criteria are met. |
| AnyinputAndTime | Any input completion and time completion | 1 | Transition to next phase happens when both: a configured value-based completion criteria is met for any input, and the configured time-based completion criteria are met. |

If any validation criterion is violated, then the validation conclusion can result in "MANUAL REVIEW REQUIRED". If all validation criteria are respected, then the validation conclusion can result in "PASS".

In various embodiments, validation criteria can be defined in a profile made of phases (e.g., phases, segments, cycles, etc.). Example characteristics of phases are detailed as follows in which reference is made to individual Input profiles. When a multiple Input (multiple channel) batch validator block is instantiated, then each of the following specifications can be applied individually: for instance, phase-based validation target values can be defined by a set of N×M parameters, where N is the number of phases and M is the number of input to be validated.

The batch validator can provide for phase validation settings, for phase and each PV input, an ideal input value target profile which is configurable or generated in real time during execution. The ideal input PV profiles type can be alternatively configured as: none (e.g., ideal profile status is No Data); constant throughout the phase (e.g., ideal profile status is good); ramp—either from input value at beginning of phase, or from the selected completion range value (e.g., low or high) where ideal profile status is good; and external, provided by a parameter that is unique for all phases and that can be wired/changed in runtime. The ramp ideal profiles can be specified either via: Ideal time to target or Ideal rate from start to target. Phase validation criteria can support the criteria as follows: Phase validation option can be deactivated for phases (e.g., the ideal target can have "No Data" status).

The Input-value validation criteria can be based on the combination of absolute range band; or tolerance band based on ideal target, either constant, ramp or external. The overall validation band can be the intersection of the area defined by the absolute ranges and the tolerance around the selected targets. The specific band validation type can be defined in Input-value and can combine with Time-based and Average Rate-based criteria.

For each phase, absolute high and low validation range can define a validation area for the input. If the input is beyond those ranges, the validation result can be "manual review required". These can be applied both in case of constant/ramp target and in case of external target. When constant or ramp ideal target profile is selected, the tolerance around the ideal target profile can be defined by high and low validation tolerances. When External ideal target profile is selected for a phase, the tolerance band can be defined by: the external ideal profile (wireable parameter) or the external high and low tolerances (wireable parameter). For constant, ramp and external ideal target profile, the tolerance band can be selected to be: off (e.g., no validation based on ideal target profile); within band (e.g., input value expected within a band around the target, defined by high and low tolerance parameters below target (e.g., input value expected to be less than the target)); and above target (e.g., input value expected to be less than the target).

Phase validation criteria can be based on time. The following time-based criteria can be an alternative and can be combined with a value-based criterion and an average rate-based criterion. One time based criterion can be based on minimum phase time expected: If the phase transition takes less than the minimum expected time (configured by the user) then the phase analysis can cause "MANUAL REVIEW REQUIRED" for the validation conclusion. One time based criterion can be based on maximum phase time expected: If the phase transition takes longer than the maximum expected time (configured by the user) then the phase analysis can cause "MANUAL REVIEW REQUIRED" for the validation conclusion. One time based criterion can be based on phase time expected to be within a Minimum time and a Maximum time: If the phase transition takes longer than the minimum expected time or less than the minimum expected time (times configured by the user) then the phase analysis can cause "MANUAL REVIEW REQUIRED" for the validation conclusion.

Given the selected ramp format, one of the following average rate-based validation can be activated: Off (e.g., no rate-based validation); Within tolerance (e.g., either the time to target or the average rate are validated against the ideal value within configured tolerances); Below target (e.g., either the time to target or the average rate are validated and expected to be less than the target value); and Above target (e.g., either the time to target or the average rate are validated and expected to be greater than the target value).

The following mechanisms can define possible phase progression criteria which can be activated simultaneously. There can be no completion criteria. Phase completion criteria could be deactivated. In this case the PV profile can be immediately ready to progress to the next phase. This can be used in multi PV batch validation, when the completion criteria are expected on other PVs.

One phase progression method can be based on time: when the duration of the phase reaches a user-configurable time limit, the phase advances. For phases that have a time-based completion configured, an indication can be provided for the remaining time for phase completion. In case other conditions are delaying the advancement of the phase, the time left indication can remain equal to zero. In case of no time-base completion criteria, the time left indication can remain zero.

Alternative example value-based phase completion criteria are listed below.

Completion Band Criteria: One phase completion method can be based on external input. A logic level input can drive the progression to the next phase. The following completion criteria can be based on input value and a completion band defined by high and low completion range parameters. One phase completion mechanism can be based on the input value entering into the completion band. One phase completion mechanism can be based on the input value exiting from the completion band. One phase completion mechanism can be based on the input value becoming greater than the completion high range. One phase completion mechanism can be based on the input value becoming less than the completion low range.

Peak detection completion: The following completion criteria can be based on the identification of a peak of the input value. When the input value rises more than the configurable peak threshold value from its local minimum during the phase, then the completion criteria can be met for the specific input (Low peak detection). When the input value falls more than the configurable peak threshold value from its local minimum during the phase, then the completion criteria can be met for the specific input (High peak detection).

Time count behavior: The time count of the phase can start from zero and advance with the device clock. However, with the following settings, that behavior can be altered. Via the Time count settings, the behavior of the phase time during a value-based violation can be configured: Continue (default); e.g., the phase time continues as normal during a value violation; Pause, e.g., the phase time pauses during a value violation and continues when the violation is over; and Restart, e.g., the phase time restarts from zero when a value violation occurs and restarts when the violation is over. With Inherit Previous Time in Band option active, the phase can start from the time within validation band of the previous phase.

In various embodiments, the batch validator core can interact with the batch operator commands and react to instrument power cycle as specified as follows. The batch validator state can be forced to Empty in case of: batch state being Empty or Loading, or validation profile not loaded. The batch validator state can be Idle if batch state is Idle and the validation profile has been loaded. When the batch starts (batch state transitions from Idle to Running), then automatically the Batch validation starts and its state transitions from Idle to Running. The batch validator function can result in MANUAL REVIEW REQUIRED in case of batch transitioning to: Paused, Aborted, Stopped, or Held.

If the batch completes (batch state transitions from Running to Complete), then the validation state can either transition to: "Pass" if no violation happened and all phases have been completed; or "Manually review required" if any violation happened or batch ended/completed before completing all phases. The batch validator function can result in MANUAL REVIEW REQUIRED in case the device has power cycled. If the status of any input is not good during a batch validation, the validation conclusion can result in "MANUAL REVIEW REQUIRED".

The Batch Validator Core can provide to external functions, such as recording engine, the information listed in the following requirements to record/present violations. General messages can include: batch validation started; batch validation completed and passed; batch validation completed and not passed; and batch validation interrupted by batch state, hence not passed. The information provided for input value-based violation of each phase can include: time of each violation; duration of each violation; maximum excursion of each violation; and phase and input of each violation. The information provided for input status-based violation of each phase can include: time of each violation; duration of each violation; and phase and input of each violation. The information provided for time-based violation can include: deviation from expected time limits for the phase; and phase of violation.

The phase time within band output parameter can: start from zero at the beginning of the phase; count up when all inputs are within the configured and respective validation bands; and restart from zero if any input has an excursion outside the validation band.

The following phase times can be indicated: Phase time, and Phase time left-only in case of configured time-based completion; shows the time left to completion; if no time-based completion, it remains zero; if the time-based completion criterion is set and the time elapsed but other input-based conditions are preventing the phase transition, then this parameter remains zero.

The "validation passed" logical level output can be: reset to false at the start of any new batch validation; and set true at the end of batch validation if the validation passed The "manual review required" logical level output can be: reset to false at the start of any new batch validation; and set true if any validation violation occurs during the batch execution.

An enumerated output also can indicate the current validation status/state, e.g., whether: Batch validation in idling; Batch validation is running—No violation occurred so far; Batch validation passed; and Batch validation not passed and manual review is required.

It should be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s) or controller(s) as described herein can be a processing system, which can include one or more processors, such as CPU, controller, application specific integrated circuit (ASIC), field programmable gate array (FPGA) or other processing unit or circuitry (or a combination thereof), which controls or performs the operations of the devices or systems, described herein. The processor(s) or controller(s) can communicate with memory/storage devices, which can store computer program(s) or application(s) (e.g., software, firmware, etc.), control or other parameter(s) and/or any other data for use in implementing the method and system described herein. Memory/storage devices can include, but are not limited to, disks, solid state drives, optical disks, removable memory devices such as smart cards, SIMS, WIMs, semiconductor memories such as RAM, ROM, PROMS, etc. Transmitting mediums or networks include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A computer-implemented method of validating process data associated with a manufacturing process, comprising:
receiving in real-time process data, including one or more process values, for a batch process associated with the manufacturing process at a digital process data recorder/controller responsible for acquiring the process data and recording the process data in a digital historical process data record, the one or more process values including one or more operating parameters and the one or more operating parameters include a temperature, a pressure, and combinations thereof;
performing a batch validation process on the digital process data recorder/controller, the batch validation process analyzing in real-time the one or more process values to validate the one or more process values of the batch process based on at least a batch validation criteria, the batch validation criteria including a tolerance for the one or more operating parameters, the tolerance including an upper bound and a lower bound, the batch validation process determining a batch validation state and a validation result for the batch process, the batch validation state indicating that the one or more process values are conformant or non-conformant at a point in time;
transmitting, from the process data recorder/controller, validation information including the batch validation state and the validation result for presentation on a device to a user, and/or recording at least on the process data record of the digital process data recorder/controller the validation information including at least the batch validation state and the validation result, wherein the validation result indicates whether the batch process is conformant or non-conformant upon completion of the batch process; and
selectively performing a corrective action based on the validation information, wherein the corrective action includes at least one of terminating, restarting, and pausing the batch process.

2. The method according to claim 1, wherein the analyzing further comprises identifying a current state of the batch process based on the one or more process values and the batch validation criteria, and
wherein the transmitting further comprises transmitting a current validation state of the batch process or the one or more process value(s), along with the one or more process values for real-time presentation on the device to the user.

3. The method according to claim 2, wherein the device comprises a human-machine interface associated with the digital process data recorder/controller, and/or a display of another system or device connected on a same local network as the digital process data recorder/controller.

4. The method according to claim 1, further comprising:
configuring the batch validation process, including the batch validation criteria, for use on the digital process data recorder/controller.

5. The method according to claim 4, wherein the validation criteria of process variables is configured by defining value and time tolerances with respect to an ideal performance.

6. The method according to claim 4, wherein the tolerance of the batch validation criteria is at least one of a rate/ramp tolerance and a time tolerance.

7. The method according to claim 6, wherein the batch process comprises a plurality of phases, the batch validation criteria including a phase validation criteria for each of the plurality of phases, the batch validation process being configured to analyze in real-time the one or more process values in each phase based on a respective phase validation criteria to validate the batch process.

8. The method according to claim 1, wherein the process data comprises a live data stream of process data including the one or more process values, and the batch process comprises a manufacturing process.

9. The method according to claim 1, wherein the recording securely records the validation information in a log in relation to the process data in memory.

10. The method according to claim 1, further comprising:
presenting on the device a current validation state of the batch process or the one or more process value(s), along with one or more current process values, the presenting operation differentiating different validation states for the batch process or the one or more process values by color, pattern or other visual differentiator.

11. A digital process data recorder/controller for validating process data associated with a manufacturing process, the process data recorder/controller being responsible for recording process data, the process data recorder/controller comprising:
communication device or interface;
memory for storing data; and
at least one processor configured to:
receive in real-time process data, including one or more process values, for a batch process associated with the manufacturing process at a digital process data recorder/controller responsible for acquiring the process data and recording the process data in a digital historical process data record, the one or more process values including one or more operating parameters, and the one or more operating parameters include a temperature, a pressure, and combinations thereof;
perform a batch validation process on the digital process data recorder/controller, the batch validation process analyzing in real-time the one or more process values to validate the one or more process values of the batch process based on at least a batch validation criteria;
transmit, via the communication device or interface, validation information including a batch validation state and a validation result for presentation on a device to a user, and/or record on the process data record in the memory the validation information including at least the batch validation state and the validation result, wherein the validation result indicates whether the batch process is conformant or non-conformant upon completion of the batch process;
the batch process comprises a plurality of phases, the batch validation criteria including a sequence of phase validation criteria for each of the plurality of phases, the batch validation process being configured to analyze in real-time the one or more process values in each phase based on a respective phase validation criteria to validate the batch process; and
selectively perform a corrective action based on the validation information, wherein the corrective action includes at least one of terminating, restarting, and pausing the batch process.

12. The digital process data recorder/controller according to claim 11, wherein the processor is configured to identify a current state of the batch process based on the one or more process values and the batch validation criteria, and wherein the processor further transmits, via the communication device or interface, a current validation state of the batch process or the one or more process value(s), along with the one or more process values for real-time presentation on the device to the user.

13. The digital process data recorder/controller according to claim 12, wherein the device comprises a human-machine interface associated with the process data recorder/controller, and/or a display of another system or device connected on a same local network as the process data recorder/controller.

14. The digital process data recorder/controller according to claim 11, wherein the processor further configures the batch validation process, including the batch validation criteria, for use on the digital process data recorder/controller.

15. The digital process data recorder/controller according to claim 14, wherein the validation criteria of process variables is configured by defining value and time tolerances with respect to an ideal performance.

16. The digital process data recorder/controller according to claim 14, wherein the batch validation criteria comprise at least a tolerance for a constant value, a rate/ramp tolerance and/or a time tolerance.

17. The digital process data recorder/controller according to claim 11, wherein the process data comprises a live data stream of process data including the one or more process values, and the batch process comprises a manufacturing process.

18. The digital process data recorder/controller according to claim 11, wherein, the processor is configured to save by securely recording the validation information in a log in relation to the process data in memory.

19. A system comprising:
   the digital process data recorder/controller of claim 11; and
   the device for presenting the validation state in real-time to a user,
   wherein the device is configured to present a current validation state of the batch process or the one or more process value(s), along with one or more current process values, the presentation differentiating different validation states for the batch process or the one or more process values by color, pattern or other visual differentiator.

20. A tangible computer medium storing computer executable code, which when executed by one or more processors, is configured to implement a method of validating process data associated with a manufacturing process, the method comprising:
   receiving in real-time process data, including one or more process values, for a batch process associated with a manufacturing process at a digital process data recorder/controller responsible for acquiring the process data and recording the process data in a digital historical process data record, the one or more process values including one or more operating parameters and the one or more operating parameters include a temperature, a pressure, and combinations thereof;
   performing a batch validation process on the digital process data recorder/controller, the batch validation process analyzing in real-time the one or more process values to validate one or more process values of the batch process based on at least a batch validation criteria, the batch validation criteria including a tolerance including an upper bound and a lower bound for the one or more operating parameters, the batch validation process determining a batch validation state and a validation result for the batch process, the batch validation state indicating that the one or more process values are conformant or non-conformant at a point in time;
   controlling transmission from the digital process data recorder/controller of validation information including the batch validation state and the validation result for presentation on a device to a user, and/or recording at least on the digital process data recorder/controller the validation information including at least the batch validation state and the validation result, wherein the validation result indicates whether the batch process is conformant or non-conformant upon completion of the batch process; and
   selectively performing a corrective action based on the validation information, wherein the corrective action includes at least one of terminating, restarting, and pausing the batch process.

* * * * *